(12) United States Patent
Pizzi et al.

(10) Patent No.: US 11,830,075 B2
(45) Date of Patent: Nov. 28, 2023

(54) SYSTEMS AND METHODS FOR MAINTAINING A WORKFLOW MANAGEMENT SYSTEM

(71) Applicant: FIS Investment Systems, LLC, Jacksonville, FL (US)

(72) Inventors: John Pizzi, San Anselmo, CA (US); Kim Vogel, Orinda, CA (US); Craig Setera, Rochester, MN (US); Christian Andraca, Novato, CA (US); Steve Lemmer, San Francisco, CA (US); Tim Morrison, Hastings, MN (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

(21) Appl. No.: 16/874,625

(22) Filed: May 14, 2020

(65) Prior Publication Data

US 2020/0273110 A1    Aug. 27, 2020

Related U.S. Application Data

(63) Continuation of application No. 16/578,218, filed on Sep. 20, 2019, now Pat. No. 11,449,943, which is a continuation of application No. 15/206,152, filed on Jul. 8, 2016, now abandoned.

(60) Provisional application No. 62/191,104, filed on Jul. 10, 2015.

(51) Int. Cl.
 *G06Q 40/06* (2012.01)

(52) U.S. Cl.
 CPC .................... *G06Q 40/06* (2013.01)

(58) Field of Classification Search
 None
 See application file for complete search history.

(56) References Cited

U.S. PATENT DOCUMENTS

| | | | |
|---|---|---|---|
| 7,778,899 B2 * | 8/2010 | Scumniotales | G06Q 40/00 705/35 |
| 7,797,226 B2 | 9/2010 | Almodovar et al. | |
| 7,881,992 B1 * | 2/2011 | Seaman | G06Q 40/025 705/35 |
| 8,346,649 B2 | 1/2013 | Waldron et al. | |
| 9,779,063 B1 * | 10/2017 | Dykema | G06F 40/103 |
| 10,699,231 B1 * | 6/2020 | Ressler | G06Q 10/103 |

(Continued)

FOREIGN PATENT DOCUMENTS

WO    WO 2011033109    3/2011

OTHER PUBLICATIONS

International Search Report and Written Opinion of the International Searching Authority, for International App. No. PCT/US16/41634, dated Nov. 10, 2016, 11 pages.

*Primary Examiner* — William J Jacob
(74) *Attorney, Agent, or Firm* — Finnegan, Henderson, Farabow, Garrett & Dunner LLP

(57) ABSTRACT

Systems, methods, and devices are presented for providing and managing investments and workflow for investors and sponsors are described. The system provides and utilizes an actionable, reliable, transparent, real-time, collaborative marketplace for facilitating funding and distribution and for reviewing the performance of private placements via an online, authoritative, unified compliance and execution platform for private placements and other investments.

16 Claims, 46 Drawing Sheets

(56) References Cited

U.S. PATENT DOCUMENTS

| | | | |
|---|---|---|---|
| 2002/0065752 A1* | 5/2002 | Lewis | G06Q 40/025 |
| | | | 705/35 |
| 2002/0128890 A1* | 9/2002 | Dick | G06Q 10/06 |
| | | | 705/7.26 |
| 2004/0225680 A1* | 11/2004 | Cameron | G06F 16/24564 |
| 2004/0243588 A1* | 12/2004 | Tanner | G06F 16/2471 |
| 2005/0049882 A1* | 3/2005 | Sawka | G06Q 10/103 |
| | | | 700/1 |
| 2005/0065977 A1* | 3/2005 | Benson | G06F 16/27 |
| 2005/0114243 A1* | 5/2005 | Scumniotales | G06Q 40/00 |
| | | | 705/35 |
| 2005/0137920 A1* | 6/2005 | O'Connor | G06Q 10/06313 |
| | | | 705/7.23 |
| 2005/0289118 A1* | 12/2005 | Schmitt | G06F 16/284 |
| 2007/0038641 A1* | 2/2007 | Fawcett | G06F 16/957 |
| 2008/0140547 A1* | 6/2008 | Murphy | G06Q 40/12 |
| | | | 705/30 |
| 2008/0222639 A1* | 9/2008 | Stockton | G06Q 40/025 |
| | | | 718/101 |
| 2010/0106547 A1* | 4/2010 | Adi | G06F 8/38 |
| | | | 705/7.27 |
| 2010/0280976 A1 | 11/2010 | Carpenter et al. | |
| 2011/0022498 A1* | 1/2011 | Ocke | G06Q 30/0641 |
| | | | 705/27.1 |
| 2012/0179696 A1* | 7/2012 | Charlot | G06F 16/36 |
| | | | 707/750 |
| 2014/0289166 A1 | 9/2014 | Wyrough et al. | |
| 2015/0012566 A1* | 1/2015 | Cartwright | G06K 7/10297 |
| | | | 707/805 |
| 2016/0253340 A1* | 9/2016 | Barth | G06F 16/122 |
| | | | 707/756 |
| 2017/0076389 A1* | 3/2017 | Simonds | G06Q 40/06 |

* cited by examiner

MyBase    Who We Are    What We Do    Education    Blog    Contact    Log Out

A private placement platform for a new era of wealth

Company is leading the reinvention of wealth management by offering a first-of-its-kind private placement platform for real estate.

We work closely with independent investment advisors, self-directed IRA platforms, university endowments, family offices, and the world's top real estate investment sponsors.

Put the power of Company to work for you.

Connect with us today.

First Name*

Last Name*

Email*
investor@company.com

Other

Company Type*
(Please check all that apply)
☐ Wealth Advisor
☐ Pension Fund or Endowment
☐ Financial Institution or Trust Company
☐ Real Estate Developer
☐ Other Your Message Submit

*FIG. 4B*

| | | | | |
|---|---|---|---|---|
| MyBase | Who We Are | What We Do | Education | Blog | Contact | Log Out |

703

| | Investment | Manager | Type | Strategy |
|---|---|---|---|---|
| Invest | ABC Horizontal Fund (ABC 2015) | Private Capital Management | Opportunistic Private Equity | Multiunit Residential Housing, Impact Investing |
| | Requirements $100,000 Accredited Investors | Fund Size $200 million | Fees 2% Management Fee 25% Carried Interest | Fund Lifetime 10 years |

506b, 704

706  706a  706b  706c  706d  706e  706f  706g

| Profile | Approach | Performance | Team | Trends | Pipeline | Library |

Profile — 710

Sponsor Overview: Private Capital Management ("PCM") is a privately held real estate operating company specializing in the investment, development, and operation of real estate assets. Since 2010, PCM has acquired, managed and redeveloped a portfolio of over 75,000 apartment units. PCM focuses primarily on low income housing and leverages its partners' relationships, track record and experience.

Fund Expected Launch: July 15, 2015 with final closing on August 13th, 2015.

Geographic Exposure: Southern regions of the United States; once fully funded at least 7 different markets.

Investment Composition: In 2015, PCM will have up to 12 discrete investments. Typically, funds have had 2-4 investments each and inclusive of additional sidecar opportunities in which a PCM affiliate serves at the managing member and the fund co-invests with other investors.

Average Turnover: Targeted hold period is 4 years, depending on market conditions.

Leverage: Property-level leverage between 20-40% of LTV. Derivatives will not be used but interest rate caps/swaps may be employed at a future date.

Cross-Liabilities: Not contemplated for this fund although from time to time other funds have advanced loans to related funds.

Lock-up Provision: There is no formal lock-up period as such, however distributions will only occur as a practical matter upon the sale or refinance of the fund's assets, which is typically 1-2 years for a refinance and 2-4 years for a sale (each from date of acquisition). The fund will have a ten-year life plus there are three one-year extensions after the ten year period.

The term of the Company will be ten years, subject to three extension periods of one year each at the discretion of the Managing Member. There is no ability to withdraw capital earlier than when distributions begin; however, in the past PCM has assisted by introducing investors wishing to sell to those seeking additional exposure, normally though only as a result of the seller's financial position requiring it.

Close Process: There is only one closing. Investors have the option to go in early under PCM's standard pre fund closing note program and earn 6.5% on their capital until closing date.

*FIG. 7B*

| MyBase | Who We Are | What We Do | Education | Blog | Contact | Log Out |

Investment
ABC Horizontal Fund (ABC 2015)

Manager
Private Capital Management

Type
Opportunistic Private Equity

Strategy
Multiunit Residential Housing, Impact Investing

Requirements
$100,000
Accredited Investors

Fund Size
$200 million

Fees
2% Management Fee
25% Carried Interest

Fund Lifetime
10 years

[ Invest ] — 506b

706b

| Profile | Approach | Performance | Team | Trends | Pipeline | Library |

Approach — 712

ABC Horizontal Fund 2015 (ABC 2015) is focused on developing reasonably priced apartment communities to families. It may invest selectively in conventional market rate apartments and other types of real estate investments.

Multi-Unit Housing Communities: ABC 2015's primary investment strategy will target both new development and acquisition of existing multi-unit residential housing communities in select markets throughout the United States with a focus on markets with strong demand drivers (e.g.: Gulf coast states).

Market Rate Apartment Communities: Given PCM's contacts in the multi-family market, they expect from time to time to have the opportunity to opportunistically acquire multifamily communities in the Southern regions of the United States. As with any real-estate investment, any renovations will be completed based on ROI potential.

*FIG. 7C*

| | MyBase | Who We Are | What We Do | Education | Blog | Contact | Log Out |

| Investment | Manager | Type | Strategy |
|---|---|---|---|
| ABC Horizontal Fund (ABC 2015) | Private Capital Management | Opportunistic Private Equity | Multiunit Residential Housing, Impact Investing |

| Requirements | Fund Size | Fees | Fund Lifetime |
|---|---|---|---|
| $100,000 Accredited Investors | $200 million | 2% Management Fee 25% Carried Interest | 10 years |

506b — invest

706c

| Profile | Approach | Performance | Team | Trends | Pipeline | Library |

Performance — 714

| Fund Name | Vintage Year | Total Equity Raised ($MM) $ million | Realized Gross IRR | Realized & Baseline forecast IRR |
|---|---|---|---|---|
| Individual and other Securities** | 1987-1990 | $79.00 | 7.80% | |
| Condo Opportunity Fund LP** | 1991 | $79.66 | 17.09% | |
| Townhome Opportunity Fund II LP** | 1993 | $82.97 | 16.37% | |
| Private REO Fund, LLC | 2000 | $18.30 | 15.27% | |
| Private REITZ, LLC | 2002 | $12.70 | 19.00% | |
| Private Chancellor Opportunity Fund LP* | 2002 | $47.60 | 18.21% | |
| Private Chancellor Opportunity Fund II LP | 2005 | $45.86 | | 3.77% |
| Housing Fund I – 1999, LP (Post 2000) | 2007 | $85.30 | | 18.50% |
| GoItAlone Horizontal Fund, LLC | 2007 | $67.70 | | 40.20% |
| Residential Opportunity Fund, LP | 2012 | $41.20 | NA | |

Notes:

Equity raised and IRR represent gross amounts for each fund together with associated sidecar JV projects
**Most of these funds had relatively low levels of lender financing, which impacted property level IRRs.

Source:

*FIG. 7D*

| MyBase | Who We Are | What We Do | Education | Blog | Contact | Log Out |

| | Investment | Manager | Type | Strategy |
|---|---|---|---|---|
| Invest<br>506b | ABC Horizontal Fund (ABC 2015) | Private Capital Management | Opportunistic Private Equity | Multiunit Residential Housing, Impact Investing |
| | Requirements | Fund Size | Fees | Fund Lifetime |
| | $100,000 Accredited Investors | $200 million | 2% Management Fee<br>25% Carried Interest | 10 years |

706d

| Profile | Approach | Performance | Team | Trends | Pipeline | Library |

Team — 716

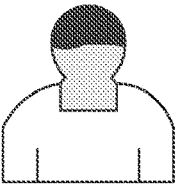

John Smith
Chairman

John Smith steers the helm of Private Capital Management. For over 10 years, he has been a visionary leader in contrarian impact real estate investing. His former company, Private Partners, with 50,000 units under management, was one of the earliest and largest buyers of multifamily housing during the RTC cycle. In September 2001, those assets were merged into Quark Residential Properties, a Seattle-based public REIT (NYSE), to create a $1.4 billion REIT. He is a University of State finance graduate.

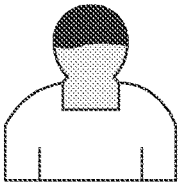

John Johnson
Chief Executive Officer

John Johnson is President and CEO of Private Capital Management. John has over 8 years of experience in all aspects of commercial real estate, including legal, originations, asset management, investment management and risk management. He has also served as a leader for three divisions of Lepton Real Estate's group, implementing its JV Equity business from inception to growth of over $17 million in annual realized net income. John holds a BA from Blue State University, a JD from Pacific Law School and an MBA from Red State.

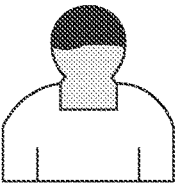

Sam Smith
Senior Managing Director

Sam Smith, Senior Managing Director, has 8 years of focused experience in underwriting and asset management. To that end, while working for Singularity Real Estate, he underwrote over 100 deals, resulting in $50 million of realized equity, for a combined total of $3.5 billion in real estate investments. Sam holds a Masters in Real Estate from Proud University and an MBA from the University of Home State California. He earned his BA from Bush University at Ergo State.

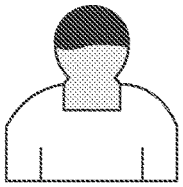

Sam Johnson
Senior Managing Director

Sam Johnson serves as Senior Managing Director of Private Capital Management, LLC and the Horizontal Funds. Sam's primary responsibilities include acquisitions (such as, nonperforming loans and bankruptcies), dispositions, and recapitalization opportunities. He holds an MBA from Spowart University, Graduate School of Central College and earned his BA in English from Cascade College.

*FIG. 7E*

| MyBase | Who We Are | What We Do | Education | Blog | Contact | Log Out |

| | Investment | Manager | Type | Strategy |
|---|---|---|---|---|
| Invest 506b | ABC Horizontal Fund (ABC 2015) | Private Capital Management | Opportunistic Private Equity | Multiunit Residential Housing, Impact Investing |
| | Requirements | Fund Size | Fees | Fund Lifetime |
| | $100,000 Accredited Investors | $200 million | 2% Management Fee 25% Carried Interest —706e | 10 years |

| Profile | Approach | Performance | Team | Trends | Pipeline | Library |

Trends — 718

Strong Investment Thesis

With low interest rates and high market valuations in equities, the case for multi-unit residential housing has never been stronger.

No. 1 – Attractive investment returns. Multi-unit housing has outperformed every asset type in commercial real estate on a one-year, three-year, five-year and eight-year basis. Multi-unit housing delivered double-digit returns in every one of those time periods.

No. 2 – Broad portfolio diversification. Multi-unit housing enables investors to achieve the strategic objective of portfolio diversification. There is a wide range of investment equity and fixed-income opportunities by geography, property type, loan duration, among other characteristics.

No. 3 – Alternative asset exposure. Multi-unit housing is not a traditional asset class like equities or fixed-income. As such, it can be considered an alternative asset. Debt and equity investments in multi-unit housing may offer returns non-correlated to traditional asset classes. Thus, multi-unit housing can reduce risk and volatility, while improving the overall performance of a portfolio.

One reason for the relative stability and safety of this asset type is the steady historical growth rates. Rental rates and revenues for multi-unit housing have increased, on average, 3% to 5% annually for the past several decades, according to the Multi-Unit Housing National Investment Board.

No. 4 – A rare growth opportunities in real estate. The market for multi-unit housing is large and expanding rapidly. The population apartment and multi-unit building renters is expected to grow 35% from 2010 to 2020. Based on 2010 population estimates, over 20% of the 12 million households rent living space in multi-unit complexes and apartments. The South, Southwest and West are experiencing the biggest increases in the renting population.

The bottom line is that multi-unit housing – as interest rates and populations in urban environments rise – is a necessity of life. A wise place to put capital is in an asset that is indispensable to a large number of people.

No. 5. – A positive impact in local communities Deploying capital to multi-unit housing is an investment in the local community. Multi-unit housing strengthens communities by allowing people to live in the same place where they have established business and personal relationships For impact investors and mission-driven investors, multi-unit housing addresses a clear social need while delivering attractive returns.

As with all investment opportunities, investors must conduct their own due diligence and carefully consider the risks and rewards. But when it comes to multi-unit housing, investors can have it both ways – the potential for terrific performance and an opportunity to maximize capital for the social and sustainable good.

*FIG. 7F*

| | MyBase | Who We Are | What We Do | Education | Blog | Contact | Log Out |

Investment
ABC Horizontal Fund (ABC 2015)

Manager
Private Capital Management

Type
Opportunistic Private Equity

Strategy
Multiunit Residential Housing, Impact Investing

Requirements
$100,000
Accredited Investors

Fund Size
$200 million

Fees
2% Management Fee
25% Carried Interest

Fund Lifetime
10 years

506b [Invest]

| Profile | Approach | Performance | Team | Trends | Pipeline | Library |

706f

Pipeline — 720

Pipeline Opportunities (Sept 2014)

Potential Deals

| Project | New Development or Rehab | Total Cap | Est Equity | Equity Timing | MSA | State | Acuity |
|---|---|---|---|---|---|---|---|
| Portal | Development | $ 62,000,000 | $ 23,000,000 | Q1 2015 | Miami | FL | IL/AL/MC |
| Charlie GA | Development | $ 30,000,000 | $ 18,000,000 | Q4 2014 | Atlanta | GA | IL |
| Mississippi | Rehab | $ 13,000,000 | $ 6,000,000 | Q4 2014 | Confidential | Confi | IL/AL |
| Texas | Development | $ 48,000,000 | $ 13,500,000 | Q4 2014 | Norcross | GA | IL |
| Gulf Coast | Rehab/Development | $ 26,500,000 | $ 8,500,000 | Q4 2014 | New Orleans | LA | AL/MC |
| Laguna Madre | Acquisition | $ 200,000,000 | $ 87,400,000 | Q4 2014 | 3-state portfolio | TX, FL, MS | IL/AL/MC |
| Cozy Acres | Rehab | $ 11,500,000 | $ 3,400,000 | Q4 2014 | Bay City | MS | AL/MC |
| Florida | Development | $ 25,000,000 | $ 7,500,000 | Q4 2014 | Tampa | FL | IL/AL/MC |
| Corpus Christi | Development | $ 51,000,000 | $ 23,000,000 | Q1 2015 | City | TX | IL/AL/MC |
| Subtotal | | $467,000,000 | $190,300,000 | | | | |
| Additional Deals Under Consideration | | | | | | | |
| Subtotal | | $315,000,000 | $125,000,000 | | | | |
| Total Pipeline Value | | $782,000,000 | $315,300,000 | | | | |

*FIG. 7G*

|   | MyBase | Who We Are | What We Do | Education | Blog | Contact | Log Out |

Investment
ABC Horizontal Fund (ABC 2015)

Manager
Private Capital Management

Type
Opportunistic Private Equity

Strategy
Multiunit Residential Housing, Impact Investing

Requirements
$100,000
Accredited Investors

Fund Size
$200 million

Fees
2% Management Fee
25% Carried Interest

Fund Lifetime
10 years

Invest — 506b

| Profile | Approach | Performance | Team | Trends | Pipeline | Library | — 706g

Library — 722
The Library provides you with the legal, marketing and due diligence materials you need to make an investment decision about this opportunity.

Have Questions?
Contact Us

Investment Documents 722a
Private Placement Memorandum
Subscription Agreement
Fund LLC Agreement
Form of Promissory Note

Marketing Documents 722b
Fund Overview

Due Diligence 722c
Fund Overview
Manager Questionnaire
Financial Statements
Pipeline Opportunities

DISCLAIMERS FOR SITE

This summary is intended solely to provide general information and summarization regarding Private Capital Management's investment capabilities and strategies. The information provided herein does not constitute, and is not intended as, an offer or sale of any security or investment product or investment advice. Offerings are made only pursuant to a private offering memorandum containing important information regarding risk factors, performance and other material aspects of the applicable investment. The information provided herein is not intended to be relied upon as investment advice or to be construed as legal, business or tax advice; each investor should consult its own attorney and business, investment, and tax advisors as to legal, business, investment and tax advice.

State
Alabama ▽

Zip Code

Phone

Email

⎫
⎬ 806a
⎭

Different Mailing Address?
☐

Are you: ☐ Single  ☐ Married  ☐ Domestic Partner  ☐ Divorced  ☐ Widowed
Dependents: [          ]

USA Patriot Act Information (Required by Federal Law)
All applicants please provide the information below. Non-resident aliens, also include a complete W-8BEN.

Date of Birth

Social Security or Taxpayer ID No.

Country of Citizenship
Country... ▽

⎫
⎬ 806b
⎭

ID Type: ☐ Driver's License  ☐ Passport  ☐ State ID  ☐ Other Government-issued ID

Place/Country of Issuance

Issue Date

Expiration Date
▽

⎫
⎬ 806c
⎭

( Save ) — 808

*FIG. 8B*

| MyBase | Who We Are | What We Do | Education | Blog | Contact | Log Out |

Profiles — 506c

Welcome to Company. This is the only resource you need to invest your clients in valuable real estate private placements. Let's get started.

Have Questions?

Contact Us

[Select Investor ▽] — 802    Create New Investor Profile — 804

| Investor | Co-Investor | Beneficiary | Accounts | Affiliations | Situation | Risk | Experience | Objectives |

805 — 805a — 805b

810

| Primary Applicant | Co-Investor | Are you, your spouse, or any other immediate family members, including parents, in-laws, siblings and dependents: |
|---|---|---|
| ☉Yes ☉No | ☉Yes ☉No | Employed by or associated with the securities industry (for example, a sole proprietor, partner, officer, director, branch manager, registered representative or other associated person of a broker-dealer firm) or a financial services regulator?<br><br>If Yes, please specify entity below. If this entity requires its approval for you to open this account, please provide a copy of the required authorization letter (with this application).<br><br>☉ Broker Dealer or Municipal Securities Dealer<br>☉ Investment Adviser<br>☉ FNRA or other Self Regulatory Organization*<br>☉ State or Federal Securities Regulator<br><br>(*including a national securities exchange, registered securities association)<br><br>Name of entity(ies): _____ |
| ☉Yes ☉No | ☉Yes ☉No | An officer, director or 10% (or more) shareholder in a publicly owned company?<br>Name of company and symbol: _____ |
| ☉Yes ☉No | ☉Yes ☉No | A senior military, governmental or political official in a non-U.S. country?<br>Name of country: _____<br><br>[Firm may consider whether to include this question in the context of its risk assessment procedures and the products and services it offers.] |

*FIG. 8C*

| MyBase | Who We Are | What We Do | Education | Blog | Contact | Log Out |

Profiles — 506c

Welcome to Company. This is the only resource you need to invest your clients in valuable real estate private placements. Let's get started.

Have Questions?

[ Contact Us ]

[ Select Investor ▼ ] Create New Investor Profile

| Investor | Co-Investor | Beneficiary | Accounts | Affiliations | Situation | Risk | Experience | Objectives |

— 805c

— 812

| Annual Income (from all sources) | Net Worth (excluding your residence) | Liquid Net Worth | Tax Rate (highest marginal) |
|---|---|---|---|
| ◯ $25,000 and under<br>◯ $25,001 - 50,000<br>◯ $50,001 - 100,000<br>◯ $100,001 - 250,000<br>◯ $250,001 - 500,000<br>◯ Over $500,000 | ◯ $25,000 and under<br>◯ $25,001 - 50,000<br>◯ $50,001 - 200,000<br>◯ $200,001 - 500,000<br>◯ $500,001 - 1,000,000<br>◯ $1,000,001 - 3,000,000<br>◯ Over $3,000,000 | ◯ $25,000 and under<br>◯ $25,001 - 50,000<br>◯ $50,001 - 200,000<br>◯ $200,001 - 500,000<br>◯ $500,001 - 1,000,000<br>◯ $1,000,001 - 3,000,000<br>◯ Over $3,000,000 | ◯ 0 - 15%<br>◯ 16 - 25%<br>◯ 26 - 30%<br>◯ 31 - 35%<br>◯ Over 35% |

| Annual Expenses (recurring) | Special Expenses (future, non-recurring) | Tax Rate (highest marginal) | |
|---|---|---|---|
| ◯ $50,000 and under<br>◯ $50,001 - 100,000<br>◯ $100,001 - 250,000<br>◯ $250,001 - 500,000<br>◯ Over $500,000 | ◯ $50,000 and under<br>◯ $50,001 - 100,000<br>◯ $100,001 - 250,000<br>◯ $250,001 - 500,000<br>◯ Over $500,000<br>*Timeframe for special expenses:*<br>◯ Within 2 years<br>◯ 3 - 5 years<br>◯ 6 - 10 years | The ability to quickly and easily convert to cash all or a portion of the investments in this account without experiencing significant loss in value from, for example the lack of a ready market, or incurring significant costs or penalties is (check one):<br>◯ Very Important<br>◯ Important<br>◯ Somewhat Important<br>◯ Does not matter | |

*FIG. 8D*

| MyBase | Who We Are | What We Do | Education | Blog | Contact | Log Out |

Profiles — 506c

Welcome to Company. The only resource you need to invest your clients in valuable real estate private placements. Lets get started.

Have Questions?

Contact Us

[Select Investor ▼]  Create New Investor Profile

| Investor | Co-Investor | Beneficiary | Accounts | Affiliations | Situation | Risk | Experience | Objectives |

— 805d

814

Investing involves risk. Different investment products and strategies involve different degrees of risk. The higher the expected returns of a product or strategy, the greater risk that you could lose most of your investment. Investment should be chosen based on your objectives, timeframe, and tolerance for market fluctuations.

Please select the degree of risk you (and any co-applicants, if applicable) are willing to take with the assets in this account:

○ Conservative. I want to preserve my initial principal in this account, with minimal risk, even if that means this account does not generate significant income or returns and may not keep pace with inflation.

○ Moderately Conservative. I am willing to accept low risk to my initial principal, including low volatility, to seek a modest level of portfolio returns.

○ Moderate. I am willing to accept some risk to my initial principal and tolerate some volatility to seek higher returns, and understand I could lose a portion of the money invested.

○ Moderately Aggressive. I am willing to accept high risk to my initial principal, including high volatility, to seek high returns over time, and understand I could lose a substantial amount of the money invested.

○ Significant Risk. I am willing to accept maximum risk to my initial principal to aggressively seek maximum returns, and understand I could lose most, or all, of the money invested.

*FIG. 8E*

| MyBase | Who We Are | What We Do | Education | Blog | Contact | Log Out |

Profiles — 506c

Welcome to Company. The only resource you need to invest your clients in valuable real estate private placements. Lets get started.

Have Questions?
Contact Us

Select Investor ▼   Create New Investor Profile

| Investor | Co-Investor | Beneficiary | Accounts | Affiliations | Situation | Risk | Experience | Objectives |

— 805e

We are collecting the information below to better understand your investment experience. We recognize your responses may change over time as you work with us.

Please check the boxes that best describe your investment experience to date.

816

| Investment | Years experience | Transactions per year (excluding automatic investments) |
|---|---|---|
| Mutual Funds/ Exchange Traded Funds | ☐ 0  ☐ 1-5  ☐ Over 5 | ☐ 0-5  ☐ 5-15  ☐ Over 15 |
| Individual Stocks | ☐ 0  ☐ 1-5  ☐ Over 5 | ☐ 0-5  ☐ 5-15  ☐ Over 15 |
| Bonds | ☐ 0  ☐ 1-5  ☐ Over 5 | ☐ 0-5  ☐ 5-15  ☐ Over 15 |
| Options | ☐ 0  ☐ 1-5  ☐ Over 5 | ☐ 0-5  ☐ 5-15  ☐ Over 15 |
| Securities Futures | ☐ 0  ☐ 1-5  ☐ Over 5 | ☐ 0-5  ☐ 5-15  ☐ Over 15 |
| Annuities | ☐ 0  ☐ 1-5  ☐ Over 5 | ☐ 0-5  ☐ 5-15  ☐ Over 15 |
| Alternatives[1] | ☐ 0  ☐ 1-5  ☐ Over 5 | ☐ 0-5  ☐ 5-15  ☐ Over 15 |
| Margins | ☐ 0  ☐ 1-5  ☐ Over 5 | ☐ 0-5  ☐ 5-15  ☐ Over 15 |

1. May include structured products, hedge funds, private placements, etc.

*FIG. 8F*

| MyBase | Who We Are | What We Do | Education | Blog | Contact | Log Out |

Profiles — 506c

Welcome to Company. The only resource you need to invest your clients in valuable real estate private placements. Lets get started.

Have Questions?

Contact Us

[Select Investor ▼]  Create New Investor Profile

| Investor | Co-Investor | Beneficiary | Accounts | Affiliations | Situation | Risk | Experience | Objectives |

805f

818

| The investments in this account will be: (select one): | I plan to use this account for the following (check all that apply): |
|---|---|
| ◉ Less than 1/3 of my financial portfolio<br>◉ Roughly 1/3 to 2/3 of my financial portfolio<br>◉ More than 2/3 of my financial portfolio | ☐ Generate income for current or future expenses<br>☐ Partially fund my retirement<br>☐ Wholly fund my retirement<br>☐ Steadily accumulate wealth over the long term<br>☐ Preserve wealth and pass it on to my heirs<br>☐ Pay for education<br>☐ Pay for house<br>☐ Market speculation<br>☐ Other: _____ |

The expected period of time you plan to invest to achieve your financial goal(s):

◉ Under 1 year   ◉ 1-2 years   ◉ 3-5 years   ◉ 6-10 years   ◉ 11-20 years   ◉ Over 20 years

Please tell us how you are funding this account (check all that apply):

☐ Income                                ☐ Insurance payout
☐ Pension or retirement savings         ☐ Inheritance
☐ Funds from another account            ☐ Social Security Benefits
☐ Gift                                  ☐ Home Equity Line of Credit/Reverse Mortgage
☐ Sale of business or property          ☐ Other: _____

UCEP ROI                                                                    820

☐ By checking this box UCEP will calculate a unique ROI specific to your profile for each fund(s).

| Vehicle | Investor | Entity Type | Date | Capital Call (Distribution) | Contribution (Withdrawal) |
|---|---|---|---|---|---|
| Buckeye Partners I, LP | Kelly Schultz | Individual | 3/31/2016 | -- | $100,000.00 |
| Boldt Partners | Greg Goodman | Individual | 3/31/2016 | -- | $100,000.00 |
| Kendall Square Offshore Fund | Kelly Schultz | Individual | 3/31/2016 | -- | -$200,000.00 |
| Buckeye Partners I, LP | Kelly Schultz | Individual | 2/29/2016 | -- | $100,000.00 |
| Boldt Partners | Greg Goodman | Individual | 2/29/2016 | -- | $100,000.00 |
| Kendall Square Offshore Fund | Michael Abbott | IRA | 2/29/2016 | -- | $200,000.00 |
| Kendall Square Offshore Fund | Greg Goodman | Individual | 1/31/2016 | -- | $100,000.00 |

| Fund Manager.io | ⌂ Dashboard | 🛠 Manage | 📋 To Do | 👤 Profile | 📄 Documents | ⊘ Help | | 👤 ≡ |

Manage > Access

Filters
Vehicle [All ▼]
Sponsor [Fernhill Capital ▼]

▼ Sponsor Service Provider | | | | | | Add ⊕
| Sponsor | Provider Type | Organization Name | Access Rights | Access | Edit | Delete |
|---|---|---|---|---|---|---|
| Fernhill Capital | Fund administrator | My Fund Admin, Inc. | Administrator | Enabled | / | ✕ |
| Fernhill Capital | Auditor | Anderson Group | Viewer | [Enable] | / | ✕ |
| [Fernhill Capital ▼] | [Lawyer ▼] | [Jones and Jones ▼] | [Viewer ▼] | [Enable] | [Save] | ✕ |

▼ Investor Service Provider | | | | | | Add ⊕
| Investor | Provider Type | Organization Name | Access Rights | Access | Edit | Delete |
|---|---|---|---|---|---|---|
| John Lennon | Accountant | HR Block | Viewer | Enabled | / | ✕ |
| Paul McCartney | Investment advisor | Gordian | Editor | [Enable] | / | ✕ |
| [Ringo Starr ▼] | [Lawyer ▼] | [Jones and Jones ▼] | [Viewer ▼] | [Enable] | [Save] | ✕ |

▶ Investor Authorized User

1540

| ID | Investor | Employee | Vehicle | Amount | Process | Progress | Next | Action |
|---|---|---|---|---|---|---|---|---|
| 56083 | Baker, Michael | Everett, Charles | Buckeye Partners, LP | $500,000 | Subscription Process | ① ② ③ ④ ⑤ ⑥ ⑦ | Incomplete: Subscription Information | Yes |
| 42108 | Fobes, Amy | Everett, Charles | Buckeye Partners I, LP | $2,000,000 | Subscription Process | ① ② ③ 4 ⑤ ⑥ ⑦ | Awaiting: Investor Execution | No |
| 65211 | Romer, Trent | Everett, Charles | Buckeye Partners, LP | $2,000,000 | Subscription Process | ① ② ③ ④ ⑤ ⑥ ⑦ | Awaiting: Sponsor Approval | Yes |
| 74546 | Haley, Catherine | Everett, Charles | Buckeye Partners, LP | $250,000 | Compliance Documentation | ① ② ③ ④ ⑤ ⑥ ⑦ | Incomplete: Complete Compliance | Yes |

| Vehicle | Tax ID | Description | Type | Report Frequency |
|---|---|---|---|---|
| Buckeye Partners I, LP | 41-978483 | Buckeye Partners "the Fund" is a short only investment partnership that... | HEDGE_FUND | Quarterly |
| Boldt Partners | 14-897461 | Boldt Partners "the Fund" is a domestic equity hedge fund investing... | HEDGE_FUND | Quarterly |
| Kendall Square Offshore Fund | 31-457283 | Kendall Square Offshore "the Fund" is a domestic equity hedge fund... | HEDGE_FUND | Quarterly |

Fernhill Capital Management
100 Drakes Landing Road
Suite 125
Cleveland, Ohio 44101
United States 216-555-6446
www.fhcm.com
info@fhcm.com Profile > Vehicles
Vehicle selector
Vehicle [All]

Dashboard | Manage | To Do | Profile | Documents | Help

Fund Manager.io

*(Screen mock-up labeled 1710)*

Fund Manager.io — Dashboard | Manage | To Do | Profile | Documents | Help

Profile > Vehicles

Vehicle selector
Vehicle: Buckeye Partners ▼

▼ Fernhill Capital Management

100 Drakes Landing Road
Suite 125
Cleveland, Ohio 44101
United States 216-555-6446
www.fhcm.com
info@fhcm.com Description

Details

100 Drakes Landing Road
Suite 125
Cleveland, Ohio 44101
United States

Tax ID: 41-978483
Type: HEDGE_FUND
Report Frequency: QUARTERLY
Fiscal year end: DECEMBER Fees

| Fund Manager.io | Dashboard | Manage | To Do | Profile | Documents | Help | |
|---|---|---|---|---|---|---|---|

Profile > Investors

Filters
Vehicle [All ▼]

▲ Fernhill Capital Management

Investors Add ⊕

| | First | Last | Address | Last | Email | Access | Edit |
|---|---|---|---|---|---|---|---|
| ▲ | Alan | Johnson | 45 Huldah Avenue, Georgetown, District of Columbia 20006 United States | 345-555-7845 | Ajohnson@demo.baseventure.com | Enabled | ✎ |
| ▲ | Amy | Fobes | 1089 Newport Avenue, Georgetown, District of Columbia 20017 United States | 310-555-8787 | Afobes@demo.baseventure.com | Enable | ✎ |
| ▲ | Anthony | Moore | 6 Irving Way, Dallas, Texas 75206 United States | 214-555-0921 | Amoore@demo.baseventure.com | Enable | ✎ |
| ▼ | Catherine | Haley | 100 Bristol Road, San Jose, California 95109 United States | 408-555-0823 | chaley@demo.baseventure.com | Enable | ✎ |

Catherine Haley
Contact Info                                                              ✎  Add entity ⊕

Address line 1                Street,                 Address line 2
City                          City,                   State              California
Zip code                      Zipcode                 Country            United States
Phone                         555-555-1212            Email              emailAddress

Additional info

Tax ID
Type of entity                Individual              Domestic or foreign?   Domestic
State of residency                                    Restricted?            No

SYSTEMS AND METHODS FOR MAINTAINING A WORKFLOW MANAGEMENT SYSTEM

CROSS REFERENCE TO RELATED APPLICATIONS

This application is a Continuation of U.S. application Ser. No. 16/578,218, filed Sep. 20, 2019, which is a continuation of U.S. application Ser. No. 15/206,152, filed Jul. 8, 2016, which claims priority to U.S. Provisional Patent Application No. 62/191,104, filed on Jul. 10, 2015, entitled UNIFIED COMPLIANCE AND EXECUTION PLATFORM FOR PRIVATE PLACEMENTS, which are hereby incorporated by reference in their entireties.

TECHNICAL FIELD

The present disclosure relates generally to systems, apparatuses, and computer-implemented methods for managing and generating data and business process workflows, such as workflows associated with alternate investments.

BACKGROUND

Investments are assets purchased by users that, presumably, appreciate in value over a period of time, providing the users with returns (gains) to the assets. Example investment assets may include stocks, bonds, property, funds, other complex investment vehicles, and so on. For example, private placement investments involve the sale of securities to a relatively small number of select investors as a way of raising capital. Private placement investors are commonly large banks, mutual funds, insurance companies, high-wealth investors, and pension funds.

Advantages of investing in private placements can include, for example, an ability to hire professional investment managers, which may potentially be able to offer better returns and more adequate risk management, the benefit of economies of scale (e.g., lower transaction costs), and increased asset diversification to reduce systemic risk. Private placements are the opposite of a public issue, in which securities are made available for sale on the open market and, as a consequence, private placements are not required to be registered with the Securities and Exchange Commission. In many cases, detailed financial information is not disclosed to investors, and in some cases, a prospectus is waived.

The potential benefits of private placements (e.g., hiring professional fund managers, and so on) and the risks of being less regulated or unregulated by a central organization of repute have created unique problems affecting efficient investment in private place investments, particularly for smaller private placements that may not have enough resources, know-how, time, or savvy to privately organize, regulate, and disseminate private fund information to a wide range and number of investors, often of different types (e.g., mutual fund investor versus high-wealth foreign individual investor), resulting in, e.g., less investor confidence and inefficient market entrance and exit strategies.

In addition, information associated with other complex or opaque investment vehicles may be difficult to provide to many investors, causing the investors and the managers of investments to miss out on matching investments with suitable investors. In such cases, conventional mechanisms for managing transactions between parties (e.g., hiring professional fund managers) and/or collecting and aggregating data underlying the transactions and associated processes generally suffer from various drawbacks, such as inefficient or cumbersome procedures often performed with unrelated entities, administrators, and documents.

The need exists for a technology that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description

BRIEF DESCRIPTION OF THE DRAWINGS

FIG. 4B is an example user interface for displaying various investor and/or sponsor characteristics.

FIGS. 7A-7H illustrate various embodiments for displaying investment information.

FIGS. 8A-8G are example user interfaces that depict a profile user interface.

FIGS. 15A-15F are example user interfaces presented by the unified investment management system.

FIGS. 16A-16F are example user interfaces presented during completion of a subscription of an investment.

FIGS. 17A-17C are additional example user interfaces presented by the unified investment management system.

FIGS. 18A-18B are example user interfaces associated with the contents of a data vault provided by the unified investment management system.

DETAILED DESCRIPTION

Overview

Figure 1:
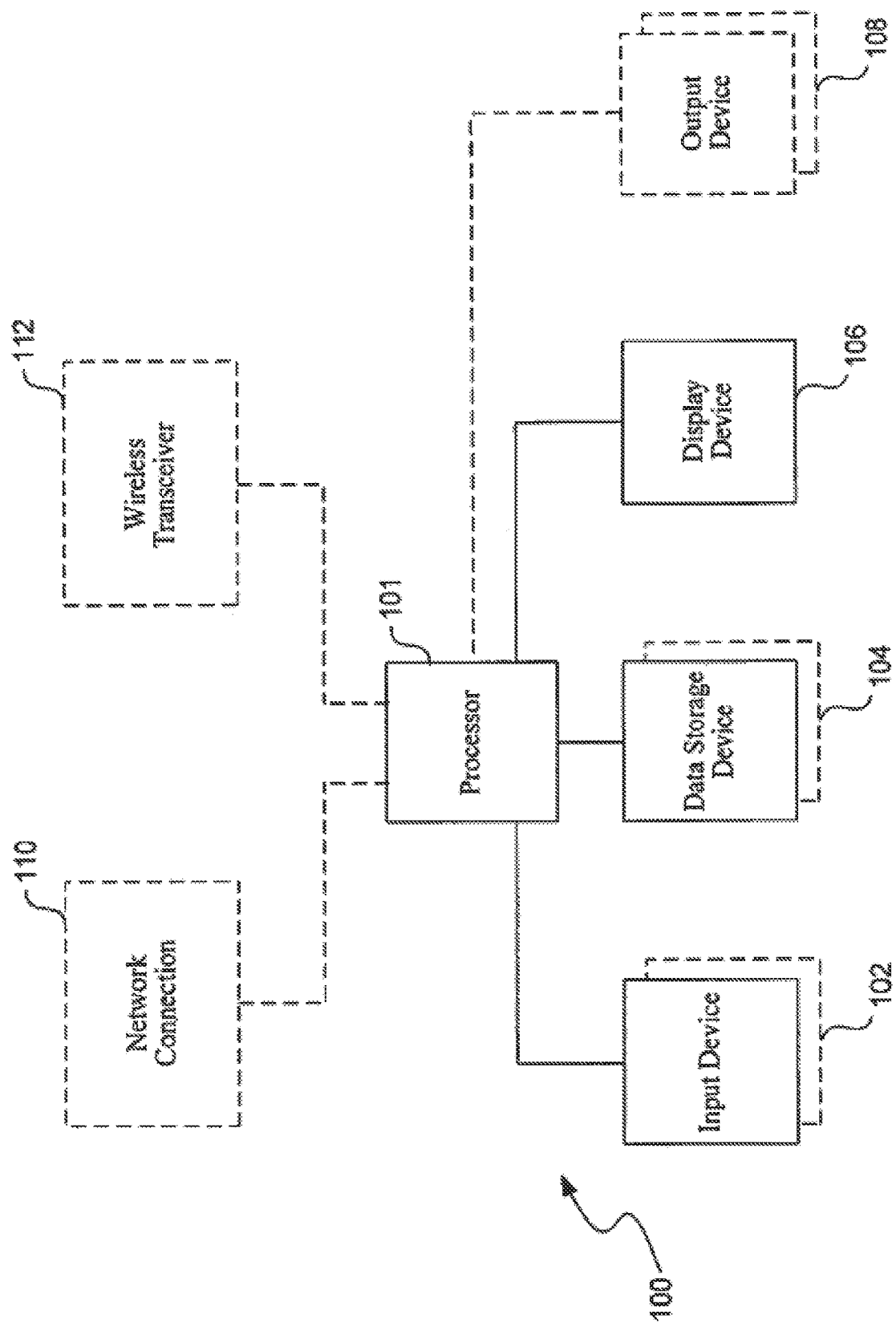
FIG. 1 is a block diagram of a basic and suitable computer that may employ aspects of the described technology.

Systems and methods for managing investments, such as presenting targeted or specific information associated with alternative investments, dynamically generating workflows based on investment data (e.g., resulting in documents representative of agreements between parties, documents completed for compliance purposes, and so on), facilitating the funding and disbursement of investments, and so on, are described. The systems and methods may be part of, or provided by, a platform supported by unified investment management system. The unified investment management system performs various actions to manage different types of alternative investments, such as private placement investments, fund-based investments (e.g., investments shared by multiple investors and managed by an entity), and so on.

In some embodiments, the unified investment management system may include a data structure component that generates, maintains, modifies, updates, and/or accesses a data structure containing one or more entries, wherein each of the one of more entries is associated with an investment. For example, each entry of the data structure relates information associated with an investment, such as an identifier for the investment, information representative of a fund associated with the investment, information representative of a user associated with the investment, and other information.

The system, therefore, may utilize the investment-tailored data structure to perform various actions associated with managing and providing investments on behalf of its users. For example, the system may include a request component that receives a request via a user interface to display information associated with investments managed by the unified investment management system, a query component that queries the investment-centric data structure to identify information associated with the investments managed by the unified investment management system that satisfies the received request, and an information component that presents the identified information that satisfies the received request.

In some embodiments, the system may apply various business logic algorithms or operations to data retrieved from the data structure in order to generate and/or augment workflows associated with the investments. For example, the system may inject the data into the algorithms to calculate or otherwise determine various results associated with a target workflow, such as a workflow associated with capital statement generation, other document generation, compliance document generation, capital call commencement, and so on.

A workflow, in some embodiments, manages and administers processes associated with investments and/or funds managed by the system. A workflow tracks and manages all steps or operations performed by the system associated with investments. Workflows generate records and other documents, such as records used to provide compliance and audit information (e.g., to support audits, regulators, and so on), records used during transactions, and so on.

For example, a workflow may obtain data from the data structure relating various data objects to an investment, perform various logic algorithms (e.g., capital management logic) utilizing the data (e.g., investor information and ownership percentages) to calculate, using the logic (e.g., a specific fee structure), to determine or calculate values (e.g., fees) to be provided in transactions, documents, and so on.

Therefore in some embodiments, the system utilizes an investment specific data structure, which includes entries that relate information for investments, in order to perform various actions associated with managing investments. Such a data structure, therefore, enables the system to perform various complex actions associated with process workflows, such as workflows associated with managing private placement investments, workflows associated with rendering and displaying various views, profiles, or interfaces of information (e.g., fund interfaces, investor interfaces, and so on), workflows associated with managing subscriptions of investments by investors, workflows associated with performing compliance and other ancillary functions, and so on.

Further, the system, via the utilization of the specific data relationships, enables transparent viewing and access of data, documents, meta data, audit records, and so on, to investors, fund managers, compliance officers, third parties, and so on. The system, therefore, may transparently exchange data and resulting records between internal parties and/or external, third, parties, among other benefits.

Examples of Workflows Associated with Private Placement Investments

Although the system is described later herein, the following section provides details regarding the use case of managing workflows for private placement investments using aspects of the systems described herein.

The inventors have recognized that private placement investments often operate based on a per-fund, per-investor, and/or per-industry basis for, e.g., raising funds; disseminating investment information; locating and qualifying investors; transferring funds; complying with state, federal, and international regulations; escrowing capital; distributing investment capital; reporting; and other investment concerns. Small to midsize investment funds may not have enough time or money to create reliable back-end technology for managing private placement operations. Instead, sponsors may resort to time-consuming and inconvenient methods of conducting business, such as mailing and/or emailing binders, prospectuses, questionnaires, and other investment data; conducting in-person or telephone conferences to discuss terms; and separately engaging accountants, lawyers, trustees, beneficiaries, escrow agents, etc. For a single fund, this manual and often unwieldy process can be repeated over and over for every prospective investor because not all investors of the same fund share the same terms, require execution of the same documents, and/or share the same capital accounts and transfer mechanisms, for example. Sponsors of multiple funds may repeat this entire process for each new fund.

Introduced below are methods, devices, and systems (collectively herein referred to as "technology") related to providing and utilizing an actionable, reliable, transparent, real-time, collaborative marketplace for facilitating funding and distribution and for reviewing the performance of private placements via an online, authoritative, unified compliance and execution platform (UCEP) for private placements. UCEP's marketplace, in various embodiments, is industry-independent. For example, real estate developers, bond investors, energy investors, and other industries can independently and simultaneously leverage the marketplace, regardless of investor type, fund size, or objectives.

UCEP's authoritative online technology organizes, schedules, verifies, shares, notifies, and analyzes private placement operations (among other operations) without the back-and-forth, manual steps currently performed by sponsors and investors. In some embodiments, the technology provides a centralized "back office" for some or all private placement funds. For example, the UCEP marketplace provides enhanced risk management and due diligence tools, strategies, and configurable workflows; sponsor and investment profiles; fund search and filtering techniques; online and collaborative access (e.g., via a local area network (LAN), wide area network (WAN), and/or mobile communication); synchronized escrow management; document digitization with document type recognition technology, configurable payment flow (i.e., capital calls in and distribution out); and access into/from third-party technologies (e.g., via application programming interfaces (APIs)).

In various embodiments, the technology provides an online portal to support all or virtually all fund sponsors' and investors' private placement operations currently being performed manually, semi-manually, offline, or semi-offline. The described technology can also supplement online transactions that require separate, often disconnected steps that may or may not occur over different communication means. For example, a sponsor emails document A to an investor and then, after a random amount of time, the investor faxes executed document A and document B back to the sponsor, who saves documents A and B to a computer folder to be later verified. The sponsor must separately review document B to determine its type (e.g., a term agreement, a Form D that is a document that the SEC requires a company to file when it issues securities in a private placement under Regulation D, and/or a Private Placement Memorandum (PPM)), whether any next steps are required (e.g., the sponsor must now obtain the sponsor's attorney's approval), and any consequences for the sponsor's and investor's workflow (e.g., document C is no longer required because the investor sent document B; however, document Z may now be required).

UCEP generates, modifies and executes sponsor- and investor-specific private placement workflows, which, in one or more embodiments, are operations, computations, strategies, goal/objective realizations, etc., that are desired (e.g., by one or more sponsors/investors or industry norms) and/or necessary (e.g., by government decree) for investing in a fund. Non-limiting workflow examples include, in one or more embodiments, verifying each party's compliance with and completion of document requests; dynamically adding steps to a new or existing workflow to conform with regulatory requirements (e.g., an investor may change his/her profile such that new verification and/or documents are necessary to prove that he/she is a "sophisticated" investor, etc.); verifying and linking to a third party (e.g., an investor's savings account); generating reports; forecasting and determining per-investor return on investment (ROI); and creating and/or managing new workflows. Workflow operations are, in some embodiments, time-based; automatically and/or manually determined; triggered (e.g., in response to receiving investor approval, sending, via an encrypted network communication, forms A-D to one or more accountants); configured to move capital between bank accounts and escrow accounts; and reusable for and across other investors/sponsors/funds/industries. UCEP generates workflows, in various embodiments, based on investor profiles, sponsor profiles, sponsor and investor input, regulatory requirements, historical information, industry information, and other private and publicly available information, for example.

In one or more embodiments, UCEP technology receives information (e.g., fund-related documentation, online/offline forms, documents, and other data) from sponsors, investors, and third parties. Information is received digitally (e.g., by being uploaded to a server, emailed, or shared from a third-party system, via File Transfer Protocol (FTP) or other data transfer means known in the art). UCEP analyzes the received information and, in one or more embodiments, is configured to determine the nature/type of the information (e.g., regulatory, term agreement, etc.), any requests within the information (e.g., requests for signatures, dates, Social Security number, bank account information, email addresses, spouse's name, checkboxes, etc.). UCEP generates and/or references a workflow (e.g., a series of steps and timing for completing fund investment) and determines where in the workflow to associate (e.g., via a database entry or other logical association) the received and/or requested information. For example, a term agreement may include a request (e.g., have a "blank" space) for an investor's name, bank account number, tax ID, signature, etc. UCEP can detect the request and, in some embodiments, automatically fill out requested information based on, for example, data in a party's profile. Additionally or alternatively, UCEP is configured to prompt a party to enter missing data via, e.g., a graphical user interface (GUI), email, Short Message Service (SMS) message or other means of notification, which can then be automatically saved by UCEP and added to the party's profile, for example.

UCEP provides an online portal for private placement investing. In various embodiments, UCEP shares and manages aggregated, digested, and synthesized fund information that is provided by fund sponsors, provided by investors, and/or separately gathered by UCEP technologies (e.g., UCEP can automatically retrieve public/private information from online resources, such as regulatory documents at government computers). Parties can access the information, via online capable technologies (e.g., computers, phones, tablets, etc.), to, for example, perform due diligence, review a fund's performance, and compare ROIs for different funds within the UCEP marketplace. Investors can directly invest, via UCEP, in one or more funds, for example, at an agreed upon amount and digitally execute any necessary documents to fulfill contractual obligations, all without leaving UCEP's online portal. In one or more embodiments, UCEP provides investor tools for reviewing, e.g., a fund's performance reports, creating online portfolios of funds, and linking external systems, such as third-party accounting programs (e.g., Addepar) and/or investment accounts (e.g., Bank of America, Pensco, Roth account, IRA, etc.).

In one or more embodiments, UCEP technology automates private placements based on UCEP profiles. For example, UCEP can create, store, and manipulate respective investor and sponsor profiles, which include some or all data required to complete investment documents. Profiles can include, in some embodiments, personal information (e.g., Social Security information, spouse's name, bank/investment account numbers, third-party login/passwords, birthday, electronic signature storage, etc.), investment information (e.g., portfolios, investment strategy, ROIs, financial account information for processing a capital call, etc.), and other information (e.g., notification preferences, third-party software information, etc.). Profiles are used by UCEP for a variety of purposes, such as, e.g., automating document completion (e.g., filling out forms), applying electronic signatures, designing/suggesting investment strategies, generating personalized ROIs, etc.

UCEP, in one or more embodiments, can manage the delivery, notification, approval, and acknowledgement of documents to/from all parties. For example, when a document is available by UCEP (e.g., the document is uploaded or linked from a third-party account), UCEP technology, in some embodiments, sends one or more notification messages (e.g., email and/or SMS, etc.) to inform parties (e.g., investors) of the document's availability. The party (e.g., investor), in response to receiving the notification, can access UCEP to review and execute the document. Then UCEP technologies can verify that the document was properly executed, update the party's (e.g., investor's) workflow (e.g., by sending a new document to the investor or to the sponsor), and/or notify the sponsor.

In various embodiments, UCEP can trigger a capital call and transfer capital from the investor's financial accounts (e.g., via one or more bank account numbers in the investor's profile) in response to detecting that necessary documents were properly completed (e.g., the documents were digitally signed via the investor's verified e-signature). For example, to facilitate or "facilitate and automate" automatic capital calls, UCEP can store (e.g., in a personalized profile) financial account information for the sender and the recipient of money, designate multiple financial accounts for different purposes (e.g., two accounts can each be associated with one or more different financial accounts), manage electronic transfer of money between a sender (e.g., investor) and a recipient (e.g., sponsor or escrow company), communicate with the Automated Clearing House (ACH) or other means for transmitting capital, and automatically initiate money transfer based on progression of a UCEP workflow (e.g., some or all of the workflow's steps are detected by UCEP as being complete). In some embodiments, UCEP technologies combine delivery of capital distribution and performance data. Harmonized distribution of funds and associated reporting simplifies an investor's management of each of his or her private placement investments, which, in some instances, may have different and multiple types of capital distribution, such as real estate funds that may include each of periodic dividends, capital return, and appreciation, for example.

In various embodiments, UCEP is configured to automatically add, modify, and/or remove documents, procedures, information, and/or requests for information to UCEP associated storage (e.g., a database) and/or to a party's profile, based on, for example, an investment type (e.g., a real estate fund versus bond fund), investor type (e.g., individual versus institutional investor), jurisdictional (e.g., domestic versus foreign), and/or other characteristic. For example, foreign investors investing in United States investments may have additional eligibility requirements, such as requiring additional withholdings and/or other information required by various regulations (e.g., Office of Foreign Assets Control, the Patriot Act, the EB5 program, etc.). UCEP can determine from one or more profile elements (e.g., a tax ID), that an investor is a non-U.S. (i.e., foreign) investor and, in response, request (e.g., via a GUI, SMS, or voice prompt) that the foreign investor fulfill additional requirements. In various embodiments, UCEP generates and/or modifies steps within the foreign investor's workflow to obtain and manage the requested information. As another non-limiting example, a high net worth ("sophisticated") investor may need to periodically prove by law his or her financial status (e.g., every three months). If the investor's status changes such that the investor no longer qualifies as "sophisticated," UCEP will request the investor to update his or her status to requalify before allowing the investor to proceed with other steps required to invest into a private placement investment.

In one or more embodiments, UCEP provides APIs and/or other programmatic techniques for integrating with third-party software to, e.g., remotely perform and/or request operations of the third-party software. For example, UCEP can integrate with other reporting services such as Mercer, which is a company that provides advice and services during various stages of the investment decision, risk management, and investment monitoring process. Mercer and/or similar organizations/technologies can issue their own assessment reports that are used by investors to determine the risk/reward of a particular fund, for example. UCEP can automate the process of requesting and receiving a Mercer report, for example, all while the investor remains within the UCEP marketplace. For example, instead of a sponsor separately contacting and meeting with Mercer employees to establish a Mercer account, uploading documents to Mercer servers, and signing various agreements, etc., UCEP provides "single-click" access (and/or other automated technology) into Mercer, without requiring additional steps traditionally required before UCEP technology. As a further example, UCEP can provide technology such as an indicator (e.g., an icon) within a GUI that, when selected by a sponsor and/or investor (e.g., via a mouse, touch screen or other input device), causes UCEP to automatically send to Mercer some or all of the required data (e.g., data associated with a party's profile) to produce a Mercer report and, if some information is still required, prompt the party to enter the missing data (e.g., via the UCEP's user interface or other input method). UCEP exchanges information with Mercer to facilitate the report's generation within Mercer and provide the completed Mercer report, via the UCEP marketplace, to the sponsor and/or investor. Messages and/or requests, regardless of when issued from a third party (e.g., Mercer), can be delivered to UCEP and then sent to a party's UCEP account for viewing offline. Billing for third-party transactions, such as for a Mercer report, can be integrated into UCEP's own billing system or directly billed to the sponsor/investor.

UCEP, in various embodiments, includes criteria-based filtering and matching for, e.g., viewing private placements within the marketplace. UCEP, as discussed above and further below, is a system of record for private placements and stores specific and generalized characteristics that are associated/tagged (e.g., linked via a database) for each investment, sponsor, and potential/actual investor. Some characteristics include a category or type of investment (real estate versus stocks), fund manager, amount of capital raised, fee structure, multi-unit versus single-family real estate, risk profile, amount of debt, location of investment, age of fund, the fund's/sponsor's goals, frequency of pipeline updates, type/method of distribution (e.g., capital appreciation versus income), fund manager's performance history, etc. Investors can apply filters (e.g., by manipulating a GUI or entering keyword text that is converted by UCEP into one or more specific search queries) to display investments having desired characteristics. Filtering can be narrowed or broadened by an investor to scale across the entire marketplace of investments within the UCEP marketplace. For example, an investor may search for funds exceeding a certain ROI for residential real estate investments of apartment buildings with 50+ units in a desired geographic location. Additionally and/or alternatively, in some embodiments, filter-based searching is automated by UCEP based on, for example, data within an investor's profile. For example, an automated UCEP search can include profile information (e.g., based on learned habits, implications, investment history, or manually entered data) that forms the basis of a query that, when executed by UCEP, attempts to locate new and/or existing funds that meet the investor's unique profile.

In some embodiments, fund profiles can be saved and/or associated with an investor's new or existing investment portfolio. For example, an investor can add a fund to a "favorites" list to, e.g., further review or compare it to other funds that would be an alternate investment opportunity or a comparable.

In one or more embodiments, UCEP includes aggregated portfolio forecasting. As described above, UCEP stores and/or has access to specific capital call, distribution data, and performance metrics. Various UCEP technologies use some or all of this information to forecast future performance information, future capital calls, and future distribution information based on, e.g., funds' characteristics, as described above. For example, as a system of record for private placement funds, UCEP obtains rich data (e.g., from an investor, sponsor, third parties, reports, funds' performance history, public information, etc.) on a per-fund basis for all funds within the UCEP marketplace. Based on the rich data collected over the life of each fund within the marketplace, UCEP technology, in some embodiments, periodically generates metadata to determine, e.g., actual ROI and investment forecasts. The more funds within UCEP, the higher the fidelity of the metadata. As the corpus of metadata becomes richer, UCEP can provide more accurate forecasts and ROIs based on, e.g., performances of similar funds (i.e., funds having similar characteristics) within the UCEP marketplace. UCEP is configured to determine and provide access to forecasts and projections as scores, reports, narratives, percentages, graphs and/or visualizations.

In some embodiments, metadata (and other information) is used by UCEP to generate investor-specific private placement ROIs ("UCEP ROIs") by analyzing actual capital calls and distributions. Private placements, as mentioned above, are less regulated or unregulated by any central authority that could, in theory, verify fund performance information provided by fund managers. This lack of transparency can create fund integrity concerns and increase the difficulty of determining a particular investor's ROI from sponsor-reported ROIs, each of which could be an ROI averaged across multiple different investors and different types of investors (e.g., individual high-wealth investors versus a mutual fund), for example. As the central record authority for funds within its marketplace, UCEP has access to rich metadata for creating new metrics (e.g., unique ROIs) separate from, and in comparison to, generic (or misleading) metrics provided by fund managers. For example, a single fund may include hundreds of investors of different types (e.g., mutual funds, institutional investors, private investors, etc.); however, a fund manager may provide a single ROI for the overall fund. As the "man in the middle" between fund sponsors and investors, UCEP is configured to collect information associated with potentially each of the hundreds of investors. UCEP "knows", for example, the investor type, the investor's actual capital amount, the investor's actual distribution data (e.g., frequency and type of distribution), etc. In one or more embodiments, UCEP uses this information to compute unique ROIs based on, for example, a specific investor or investor type. UCEP's independent verification of fund performance injects authoritative trustworthiness into private placements and aids investors with up-to-date, actionable metadata for making critical business decisions and, at the same time, reducing risk inherent in self-reporting or semi-self-reporting private funds.

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

Certain details are set forth in the following description and in FIGS. 1-12 to provide a thorough understanding of various embodiments of the disclosure. Other well-known structures and systems often associated with private placement investments have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions, and other features shown and described in conjunction with the Figures are merely illustrative of particular embodiments of the disclosure. Accordingly, other embodiments can have other details, dimensions, functions, and features without departing from the spirit or scope of the present disclosure. In addition, those of ordinary skill in the art will appreciate that further embodiments of the disclosure can be practiced without several of the details described below.

The terminology used in the description presented below is intended to be interpreted in its broadest reasonable manner, even though it is being used in conjunction with a detailed description of certain specific embodiments of the described technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 2:
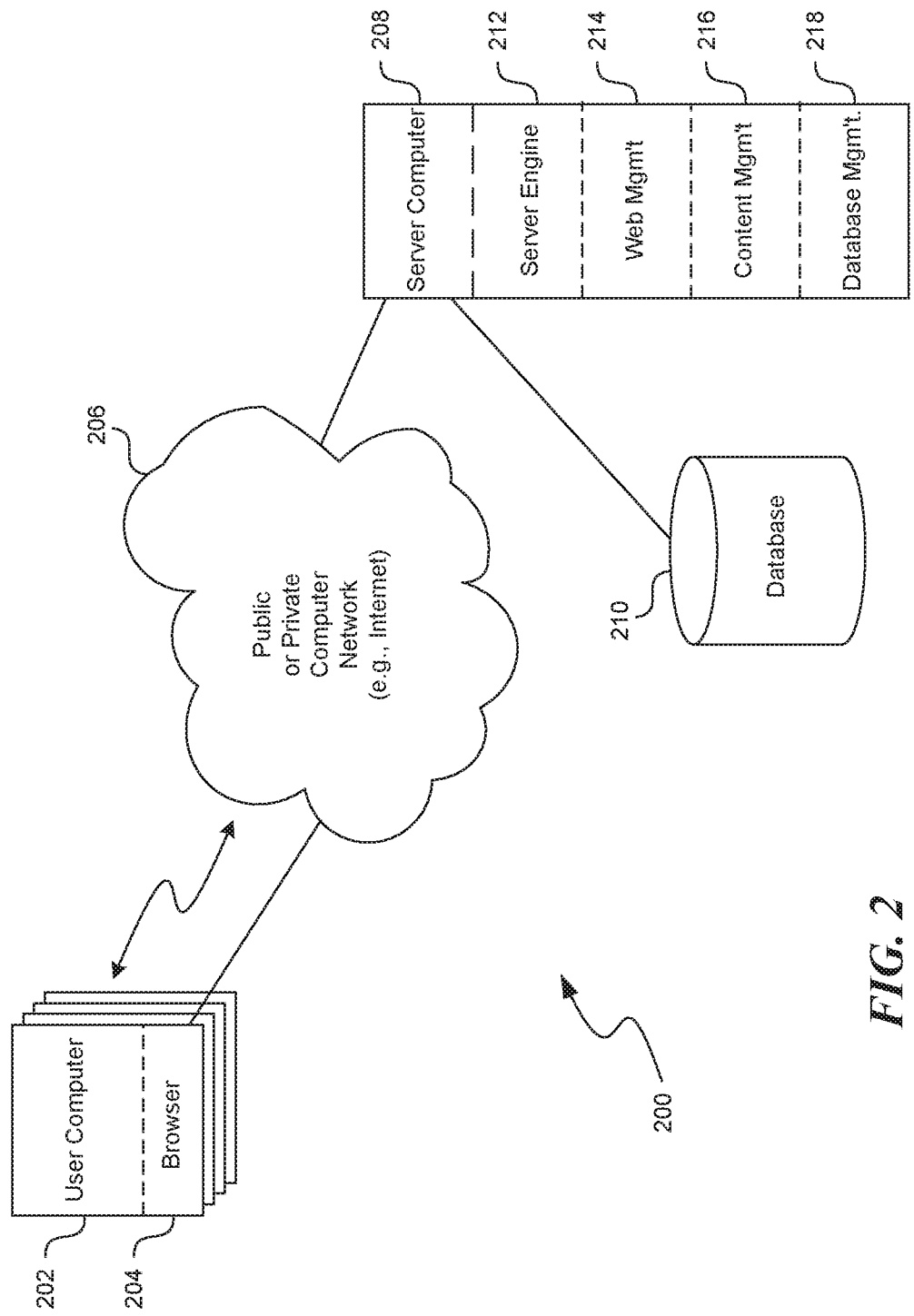
FIG. 2 is a block diagram of a basic and suitable network and network resources that may employ aspects of the described technology.

FIGS. 1-2 and the following discussion provide a brief, general description of a suitable computing environment in which aspects of the described technology can be implemented. Although not required, aspects of the described technology may be described herein in the general context of computer-executable instructions, such as routines executed by a general- or special-purpose data processing device (e.g., a server or client computer). Aspects of the described technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media known or derived from future storage technology configurable to store computer instructions. Alternatively, computer-implemented instructions, data structures, screen displays, and other data related to the described technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet-switched, circuit-switched, or other scheme).

The described technology can also be practiced in distributed computing environments where tasks or modules are performed by remote processing devices, which are linked through a communications network, such as a LAN, a WAN, or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the described technology are also encompassed within the scope of the described technology.

Portions of the described technology can be practiced on and/or distributed between one or more network appliances. A network appliance is a stand-alone device connected to a network and can be configured to communicate with another network appliance, server, and/or other computing device.

Referring to FIG. 1, the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard, a pointing device such as a mouse, and described technology for receiving human voice, touch, and/or sight (e.g., a microphone, a touch screen, and/or smart glasses). Other input devices are possible such as a joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Aspects of the described technology may be practiced in a variety of other computing environments. For example, referring to FIG. 2, a distributed computing environment with a network interface includes one or more user computers 202 (e.g., mobile devices) in a system 200, each of which includes a GUI program component (e.g., a thin client component, web browsers, etc.) 204 that permits the computer to access and exchange data, such as network and/or security data, with a network 206 such as a LAN or the Internet, including web sites, FTP sites, live feeds, and data repositories within a portion of the network 206. The user computers 202 may be substantially similar to the computer described above with respect to FIG. 1. The user computers 202 may be personal computers (PCs) or mobile devices, such as laptops, mobile phones, or tablets. The user computers 202 may connect to the network 206 wirelessly or through the use of a wired connection. Wireless connectivity may include any forms of wireless technology, such as a radio access technology used in wireless LANs or mobile standards such as 2G/3G/4G/LTE. The user computers 202 may include other program components, such as a filter component, an operating system, one or more application programs (e.g., security applications, word processing applications, spreadsheet applications, or Internet-enabled applications), and the like. The user computers 202 may be general-purpose devices that can be programmed to run various types of applications, or they may be single-purpose devices optimized or limited to a particular function or class of functions. More importantly, any application program for providing a GUI to users may be employed, as described in detail below. For example, a mobile application or "app" has been contemplated, such as one used in Apple's® iPhone® or iPad® products, Microsoft® products, Nokia® products, or Android®-based products.

At least one server computer 208, coupled to the network 206, performs some or all of the functions for receiving, routing, and storing of electronic messages, such as security data, web pages, audio signals, electronic images, and/or other data. While the Internet is shown, a private network, such as an intranet, may be preferred in some applications. The network may have a client-server architecture, in which a computer is dedicated to serving other client computers, or it may have other architectures, such as a peer-to-peer, in which one or more computers serve simultaneously as servers and clients. A database or databases 210, coupled to the server computer 208, store some content (e.g., security-related data) exchanged between the user computers 202; however, content may be stored in a flat or semi-structured file that is local to or remote from the server computer 208. The server computer 208, including the database(s), may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, one or more web management components 214, a content management component 216, and a database management component 218. The server engine 212 performs basic processing and operating system level tasks. The web management component 214 handles creation, streaming, processing, and/or routing of networking and/or security data. The web management component 214, in various embodiments, includes technology for storing private placement data and providing a private placement portal, described below. Users may access the server computer 208 by means of a network path associated therewith. The content management component 216 handles processes and technologies that support the collection, managing, and publishing of private placement data, network data, and/or other data. The database management component 218 includes storage and retrieval tasks with respect to the database, queries to the database, and storage of data. In some embodiments, multiple server computers 208, each having one or more of the components 212-218, may be utilized. In general, the user computer 202 receives data input by the user and transmits such input data to the server computer 208. The server computer 208 then queries the database 210, retrieves requested pages, performs computations, and/or provides output data back to the user computer 202, typically for visual display to the user.

Figure 3:
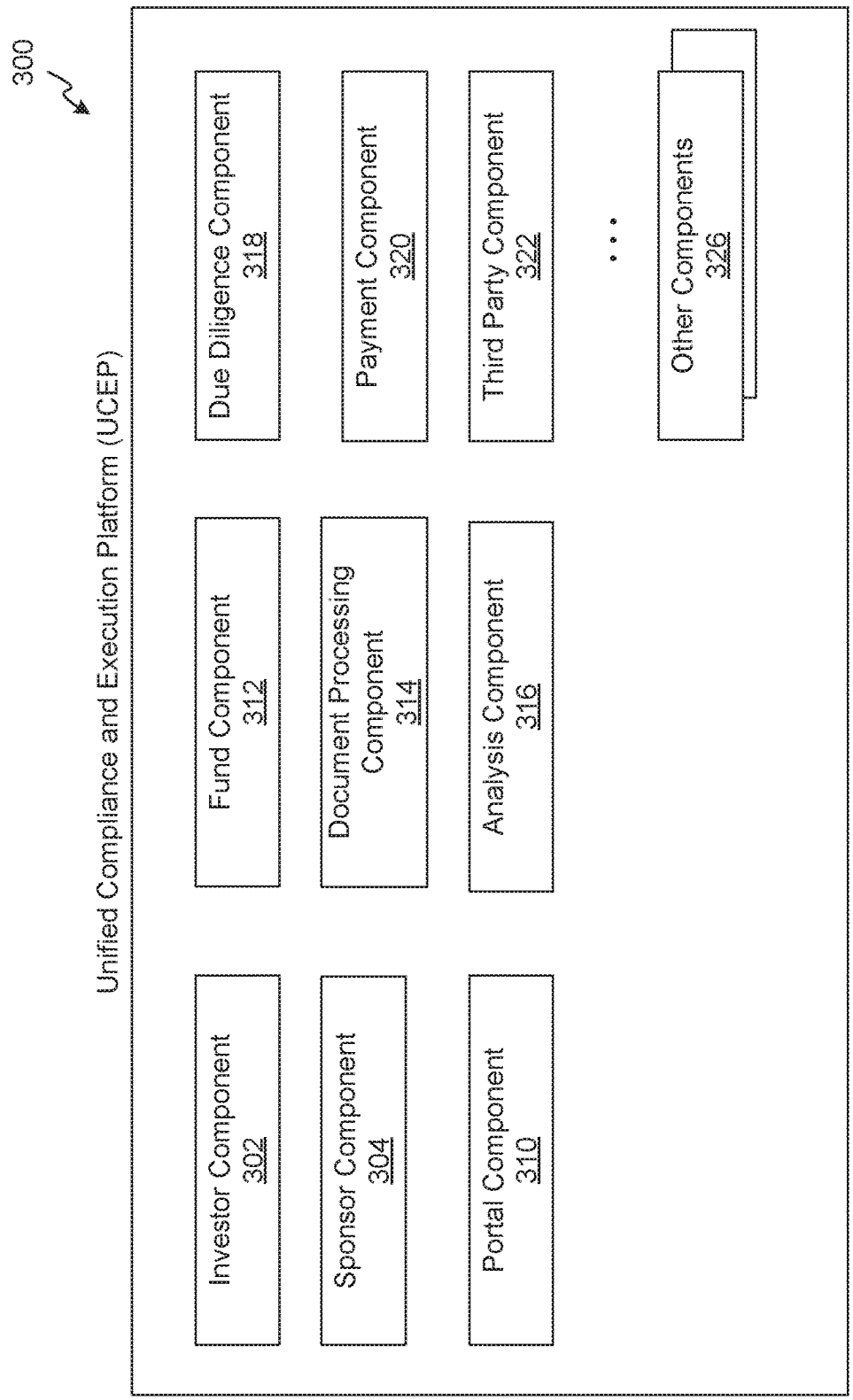
FIG. 3 is a block diagram of a unified compliance and execution platform for private placements that employs aspects of the described technology.

FIG. 3 is a block diagram 300 of a unified compliance and execution platform for private placements including several components and/or engines 302-326, such as an investor component 302, sponsor component 304, portal component 310, fund component 312, document processing component 314 (which may include document management and business workflow components), analysis component 316, due diligence component 318, payment component 320, third-party component 322, and other components/engines 326. UCEP provides a centralized, authoritative, collaborative, online workflow management marketplace for private placement investing. Investor component 302 gathers information from investors, such as login information, contact information, investment objectives, financial status, bank/savings/investment accounts, spouse information, notification preferences, and other information useful for determining an investor's preferences, investment strategies, portfolio holdings, investment history, and preferred/favorite funds and for creating an investor profile. Sponsor component 304 is similar to investor component 302 and can include similar types of information. Sponsor component 304 can additionally include advertisement and marketing information, sponsor information, and other information useful for providing to an investor. Portal component 310 provides technology for supporting an interface (e.g., a GUI) to a virtual space (e.g., a webserver-based system, database, mobile application, etc.) that hosts UCEP information and tools for sponsors and investors, such as workflows, data repositories, report generators and viewers, and management tools for uploading, downloading, and manipulating (e.g., e-signing) documents, etc. Sponsors and investors can search the UCEP database(s) for specific funds (e.g., based on one or more fund characteristics), update their profiles, and create/manipulate portfolios of funds, for example. Fund component 312, in various embodiments, manages sponsor funds, including storing and hosting fund documentation, storing/generating/managing fund workflow (e.g., which documents are needed, their order for review/completion, timing considerations, notifications, etc.), and/or authenticating investors' access to fund information via, e.g., the portal component 310. Document processing component 314 provides tools for manipulating and providing access to documents made available by investors or by sponsors or obtained by UCEP (e.g., UCEP technology can manually or automatically download regulatory or other documents from online resources). Some tools provided by the document processing component 314 include document upload, download, storage, securitization, retrieval, digitization, and manipulation (e.g., reviewing, signing, highlighting, commenting, revising, or other means of document processing). Analysis component 316, in various embodiments, processes, analyzes, compiles, sorts, compares, and evaluates fund information for determining general and investor-specific ROIs, generates reports (e.g., for comparing funds, ROIs, forecasting, etc.), and automatically selects and/or suggests funds that meet criteria of a sponsor's and/or investor's profile, for example. Due diligence component 318 provides sponsors and investors with access, via portal component 310, to fund data, information, profiles, marketing, and documentation for determining, e.g., whether or not to invest into one or more funds. Payment component 320, in one or more embodiments, accesses investors' (and sponsors') capital accounts for, e.g., investing in one or more private placement funds. For example, payment component 320 can access investors' and sponsors' investment accounts, saving/checking accounts, IRAs, etc. for transferring capital to UCEP, to an escrow account/agent, and/or directly to a sponsor's account for investing in funds and distributing capital returns. Third-party component 322 provides access (e.g., via APIs) into software, systems, and platforms operated by third parties. For example, data can be sent from and to third-party accounting, reporting, project management, investment, and other products for integrating into their technologies. Similarly, UCEP can pull data (e.g., via APIs) from third-party programs into UCEP for use by other components 302-326, such as analysis component 316 (e.g., for generating reports). Other components 326 are used by, available to, and/or programmable by UCEP/sponsors/investors.

FIGS. 4A-10 illustrate an example embodiment generated by, e.g., portal component 310. By non-limiting example, FIGS. 4A-10, in one or more embodiments, depict an online portal, such as a website. To simplify understanding of UCEP technology, FIGS. 4A-10 feature real estate private placement investments; however, funds may invest in any industry to create a multi-private placement investment marketplace.

Figure 4A:
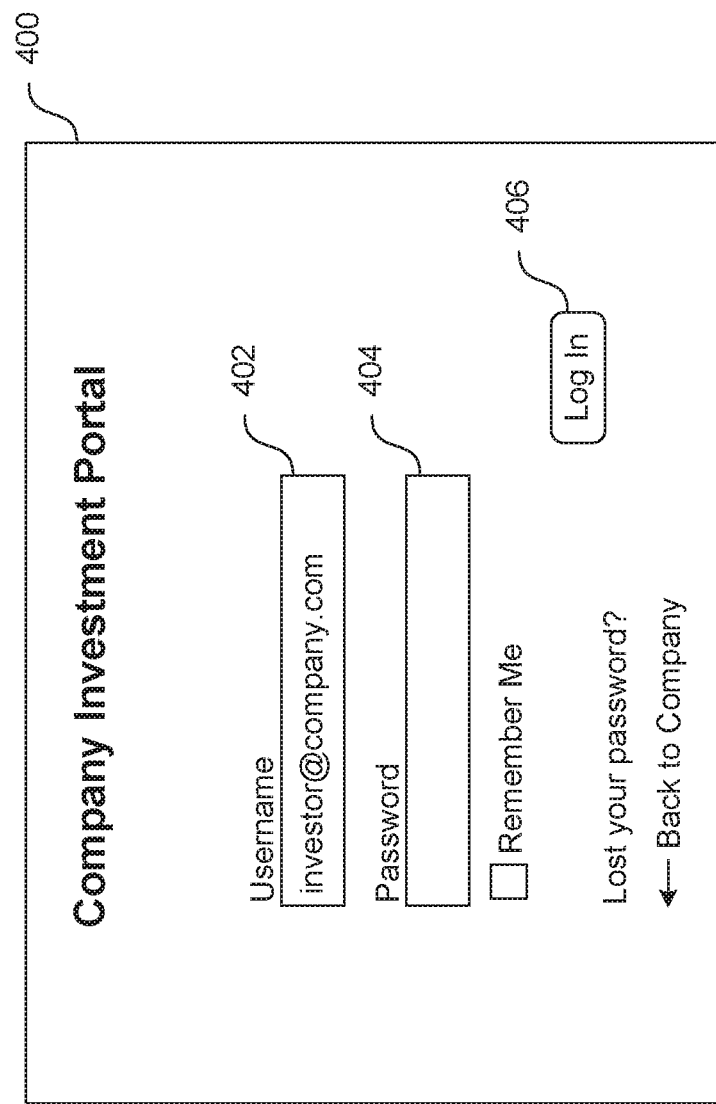
FIG. 4A is an example user interface that is configured to allow sponsors and investors authorized access into an UCEP marketplace.

FIG. 4A depicts an example login GUI 400 that is configured to allow sponsors and investors (or potential sponsors and/or investors) authorized access into the UCEP marketplace. Investors and sponsors can enter usernames 402 and passwords 404 for logging in 406 to the UCEP marketplace. FIG. 4B shows an example GUI 420 implemented by UCEP technology for displaying various investor and/or sponsor characteristics 422, including but not limited to first name 424, last name 426, email address 428, other information (not shown) 430 and investor/sponsor characteristics 432 that are submitted (e.g., via button 436) to UCEP for generating, e.g., one or more sponsor and/or investor profiles. For example, investor/sponsor characteristics 432 display characteristics primarily for sponsors who might be wealth advisors, pension funds or endowments, financial institutions or trust companies, real estate developers, or other types of industry sponsors; however, UCEP, in other embodiments, displays investor/sponsor characteristics for different types of investors (e.g., high-income investor, IRA investor, etc.). Optionally, a message 434 is provided to send additional information to UCEP for creating a profile.

Figure 5:
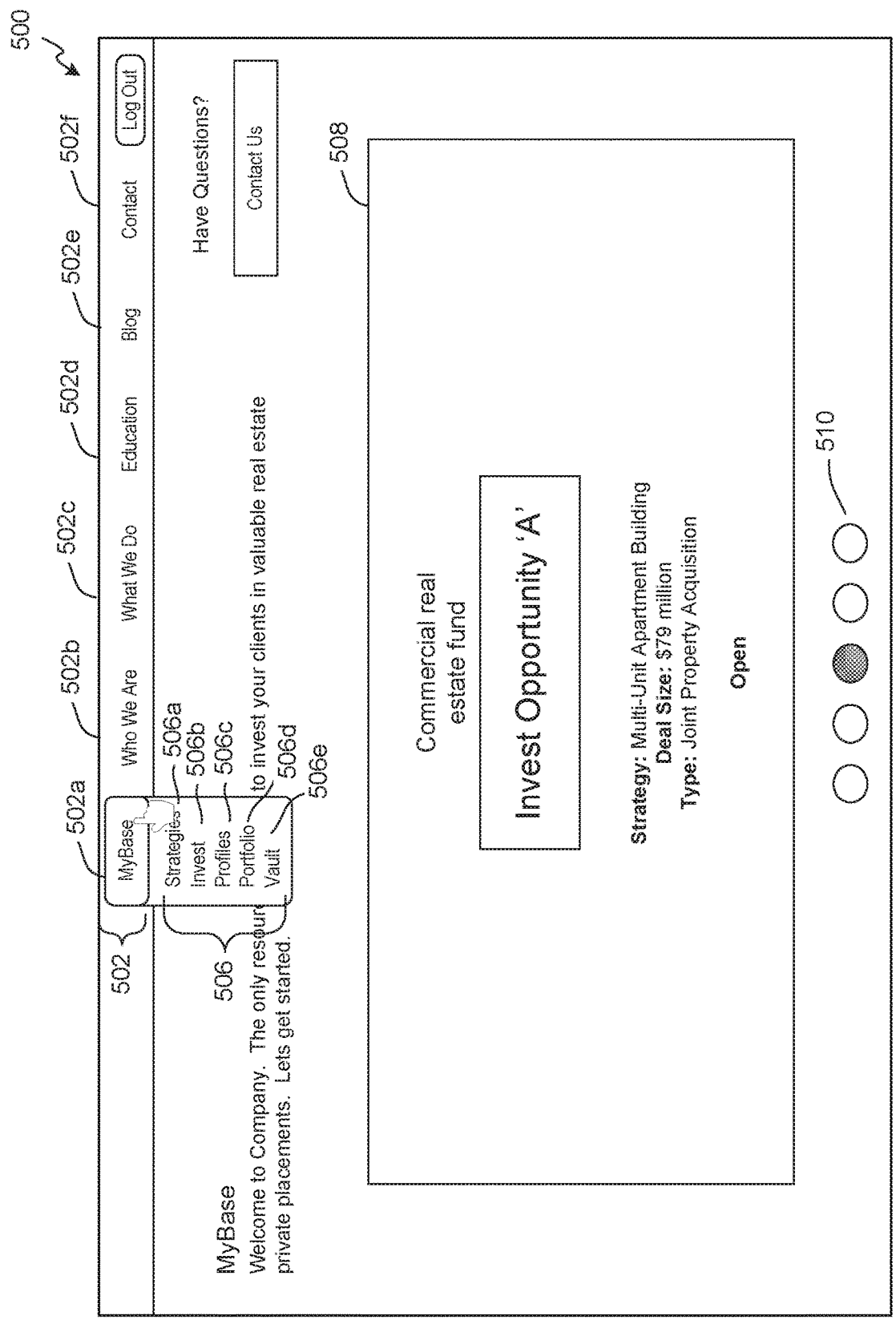
FIG. 5 is an example user interface dashboard.

FIG. 5 illustrates an example user (e.g., sponsor or investor) dashboard 500. In various embodiments, dashboard 500 is used by a user to navigate to various features implemented by UCEP and for displaying fund information display 508. Fund display 508 can display information (e.g., fund advertisements, open/close fund information, portfolio status, ROIs, and/or other customizable information) automatically, periodically, and/or manually (e.g., by selecting indictors 510). Menu bar 502 includes navigable menus for viewing sponsor/investor information 502*a*, information regarding UCEP 502*b*, marketplace services offered 502*c*, education materials 502*d*, interactive comments 502*e*, and contact information 502*f*. Sponsor/investor information 502*a* includes navigable menus for accessing investor/sponsor-specific information 506, such as Strategies 506*a*, Investing 506*b*, Profiles 506*c*, Portfolio 506*d* and Vault 506*e*, each of which is further discussed below.

Figure 6:
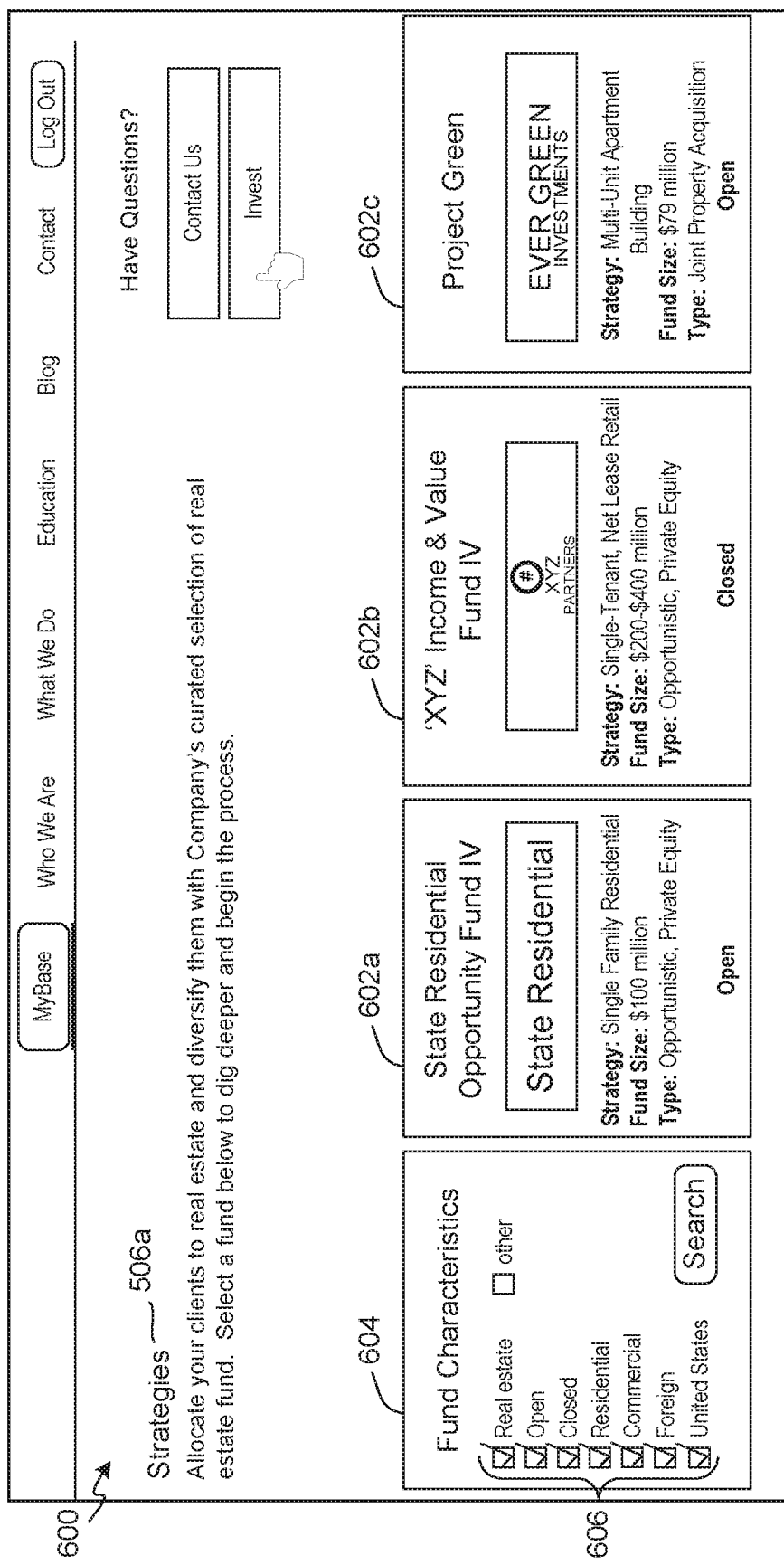
FIG. 6 is a strategy user interface.

FIG. 6 depicts a non-limiting example of a strategy user interface 600 that is one embodiment of a user interface displayed after the strategies menu option 506*a* of FIG. 5 is selected. Strategy user interface 600 includes fund information 602*a*-602*c*, which is similar to fund information display 508 and which displays to sponsors and/or investors, for example, advertisements for funds seeking investment, UCEP-selected funds that match one or more characteristics in a sponsor's and/or investor's profile, advertisements for funds seeking investment, etc. Strategy user interface 600, in various embodiments, includes a search engine 604 for searching for funds having one or more characteristics 606, such as a particular fund type (e.g., real estate), an open or closed fund, fund type subcategory (e.g., residential and/or commercial real estate), jurisdiction/geography (e.g., domestic-, foreign-, state-based investments), and/or other characteristics (e.g., ROI, capital raised, term, etc.) for categorizing funds.

Figure 7A:
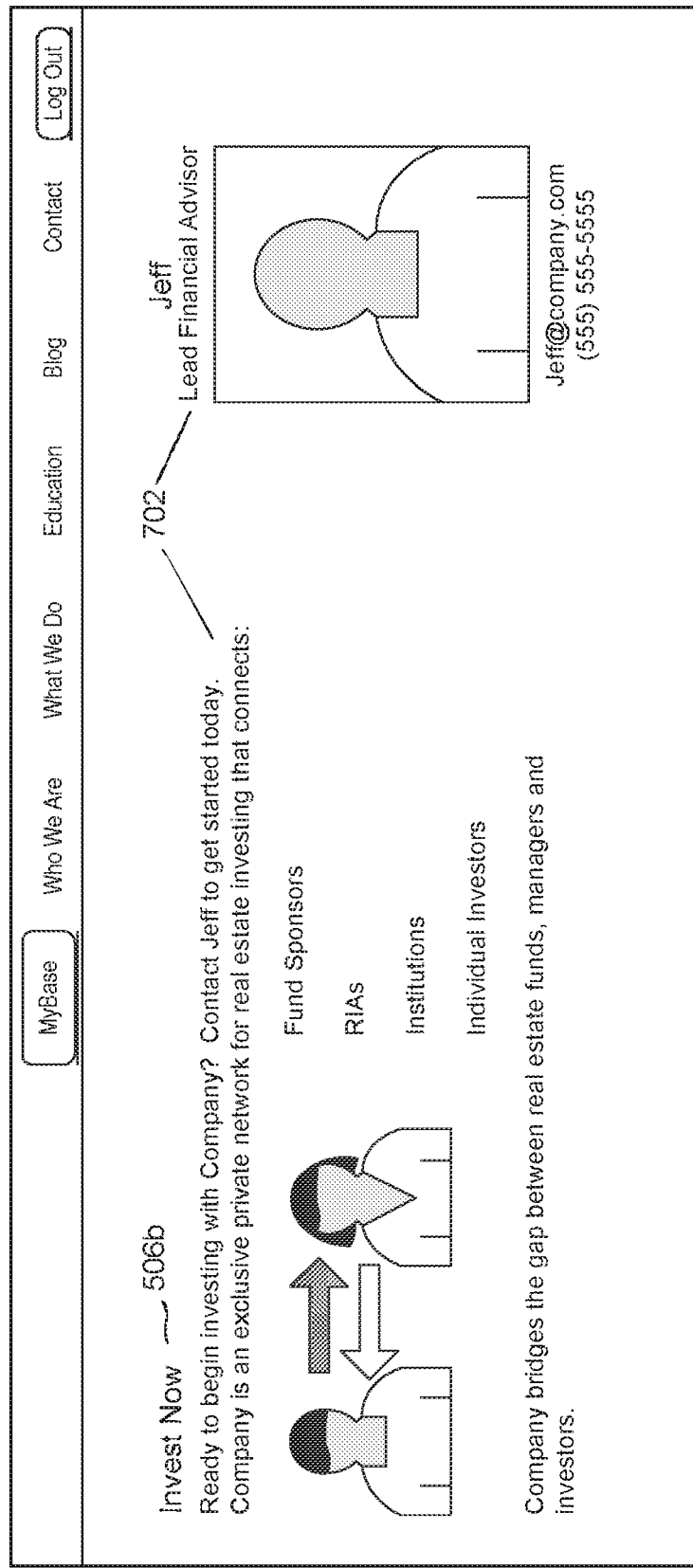

FIGS. 7A-7H illustrate various embodiments for displaying investment information after selecting Invest menu option 506*b*. FIG. 7A depicts a user interface 700 that displays contact information 702 associated with a sponsor, e.g., based on the sponsor's profile or other information. FIG. 7B depicts a unified fund analysis interface 703 generated by UCEP to display fund-specific information (e.g., for the ABC Horizontal Fund), including information derived from information and documentation received from fund sponsors. For example, in some embodiments, fund sponsors upload documents (e.g., PDFs, Google Docs, etc.) into their private account within the UCEP marketplace. UCEP technology is configured to scan uploaded documents, perform character recognition, identify the document type (e.g., a prospectus) and its subsections, recognize portions of the documents that request investor feedback (e.g., signature blocks, approval indications, etc.), and act on this information. In various embodiments, once information is recognized by the technology, it is available for use by other aspects of the described technology, such as profiles, search strategies, and making recommendations. Overview section 704 displays fund summary information extracted from recognized information, and menu bar 706 displays selectable menu options 706a-706g for displaying additional information at, e.g., display section 710. For example, display section 710 displays fund profile information when the profile menu option 706a is selected. FIG. 7C is an example of a display of a fund's approach 712 that is displayed by UCEP technology after the associated fund's information is available (e.g., it is uploaded by a sponsor) and after the approach menu option 706b is selected. Similarly, FIG. 7D is an example of a fund's performance data 714 that is displayed when the performance menu option 706c is selected. FIG. 7E is an example of a fund's management team 716 that is displayed by UCEP technology when the team menu option 706d is selected. FIG. 7F is an example of a fund's trending information 718 that is displayed by UCEP technology when the trend menu option 706e is selected. FIG. 7G is an example of a fund's investment pipeline information 720 that is displayed by UCEP technology when the pipeline menu option 706f is selected, and FIG. 7H is an example of a fund's library of legal, marketing and due diligence materials 722 that is displayed when the library menu option 706g is selected.

Referring to FIG. 7H, a fund's library includes some or all of the documents (or links to the documents) necessary to research and invest in a fund. Investors can access fund documents (e.g., by clicking on links associated with the documents), review the documents (e.g., via UCEP document viewers), sign and date documents (e.g., via UCEP document manipulation tools), and submit to UCEP executed documents according to a workflow automatically determined by UCEP and/or configured by sponsors using, for example, one or more components 302-326 (e.g., the fund component 312). For example, an investor can access investment documents 722a by clicking respective links for, e.g., Private Placement Memorandum, Subscription Agreement, Fund LLC Agreement, and Form of Promissory Note; can access marketing documents 722b by selecting e.g., Fund Overview; and can access due diligence documents 722c, by selecting, e.g., Fund Overview, Manager Questionnaire, Financial Statements and Pipeline Opportunities. Each of the respective types of documents 722a-722c, in some embodiments, is available for review and execution (as necessary) without the investor leaving the UCEP marketplace (e.g., documents can be e-signed within UCEP). In various embodiments, one or more of each of the respective types of documents 772a-722c are downloadable for review and execution and, subsequently, can be uploaded into UCEP, which will, for example, scan, categorize, and verify the documents and store them in one or more UCEP data repositories. In one or more embodiments, when a document has completed one or more stages of a workflow (i.e., one or more steps of reviewing, signing, and funding an investment), UCEP will notify the other party and proceed to the next step in the workflow (e.g., verifying funds for sending to escrow).

Figure 8A:
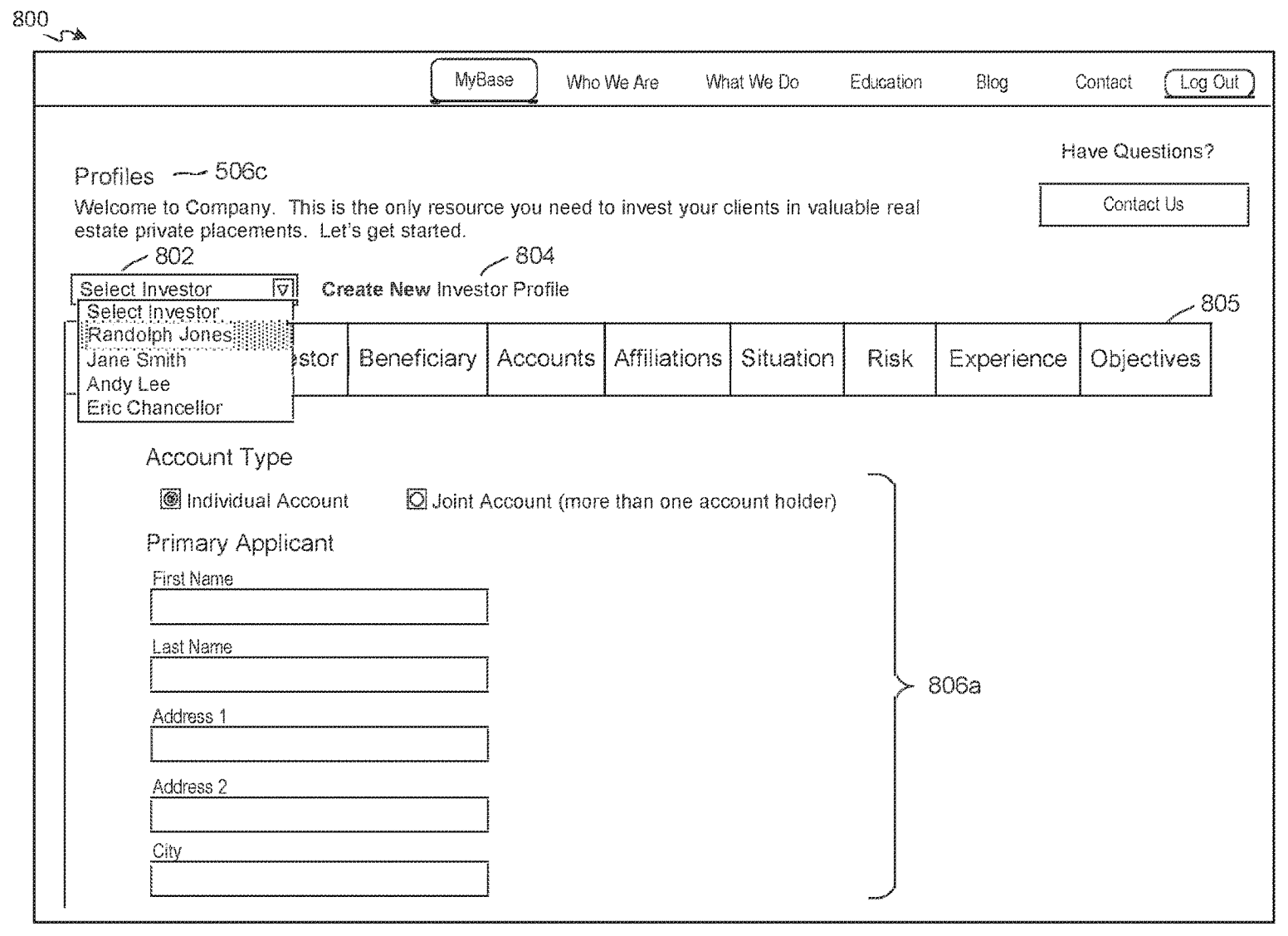

FIGS. 8A-8G are non-limiting examples of a profile user interface 800 when the profiles menu option 506c is selected, for example. Profile user interface 800 includes, for example, profile menu bar 805, investor menu 802 (or, alternatively, sponsor menu (not shown)) for modifying existing sponsor and investor profiles, and one or more links 804 for creating new profiles. For example, in reference to FIGS. 8A-8B, when the investor menu option 805a is selected, UCEP is configured to display and save 808 to its repositories account type profile information 806a, regulatory profile information 806b, and citizenship information 806c, for example. Other profile information (e.g., preferred fund types, desired ROI, etc.) is contemplated by the inventors. FIG. 8C is another example of profile information requested by UCEP, such as affiliation information 810 that is displayed when the affiliations menu option 805b is selected. FIG. 8D is an example request of situation information 812 that is displayed when situation menu option 805c is selected. FIG. 8E is an example request of risk information 814 that is displayed when risk menu option 805d is selected. FIG. 8F is an example request of experience information 816 displayed when experience menu option 805e is selected, and FIG. 8G is an example request of objectives information 818 displayed when objectives menu option 805f is selected. Profile user interface 800, as referred to in FIG. 8G, can also include other options, such as an option 820 for requesting that UCEP analyze and generate investor-specific ROIs based on, for example, one or more types of profile information. For example, if option 820 is selected (e.g., by a mouse), UCEP is configured to generate a UCEP ROI. The UCEP-generated ROI is, in one or more embodiments, based on a particular fund (e.g., XYZ real estate fund) and one or more of the investor's profile characteristics. For example, UCEP can generate an ROI for investor X based on investor X being identified (via his/her profile) as having an investor type of high-value investors even if that fund only issues general ROIs (i.e., irrespective of the investor type, etc.). UCEP-generated ROIs are useful to an investor, at least because they can remove opacity and confusion around computing the actual ROI for a specific investor in the fund.

Figure 9A:
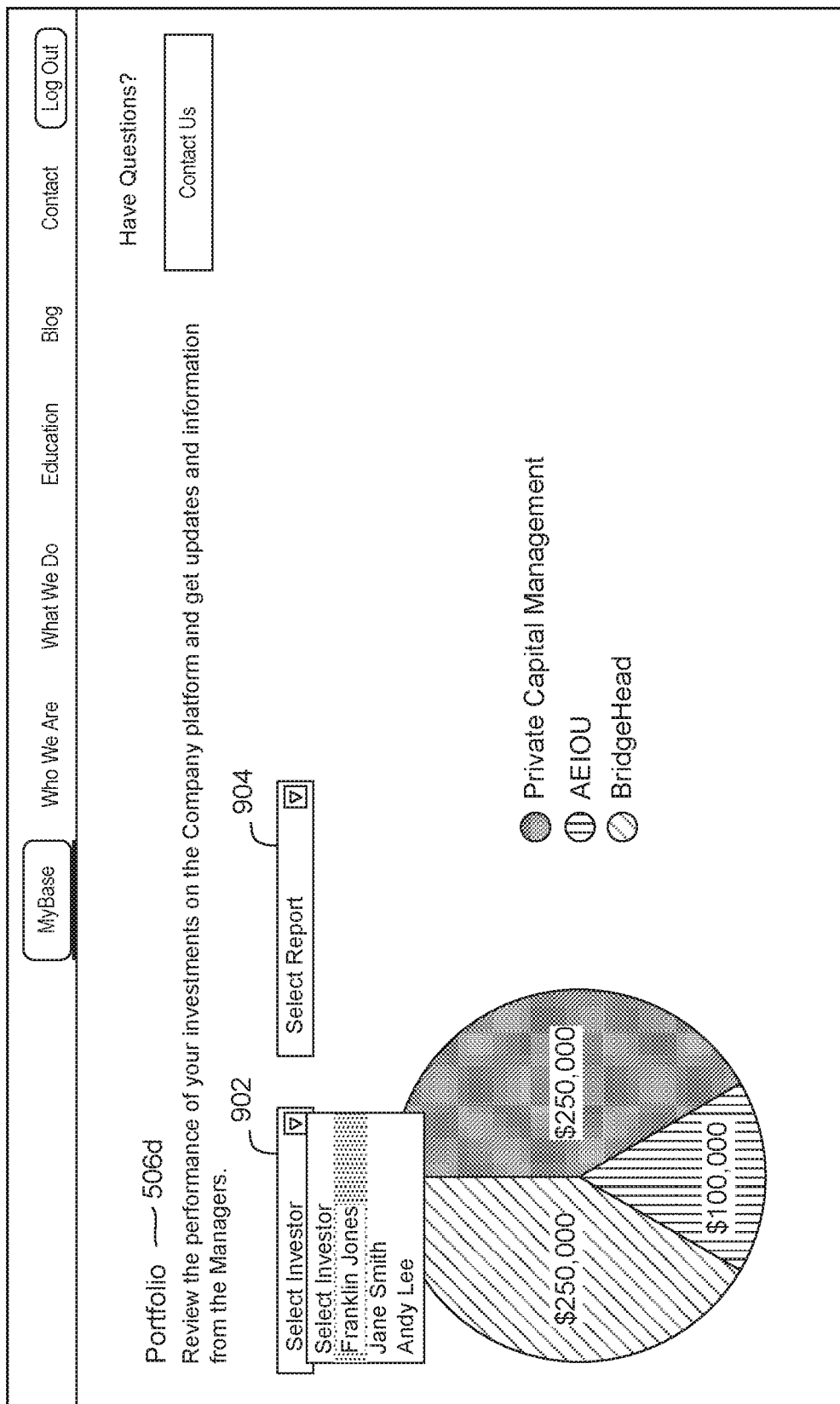
FIGS. 9A-9B are example portfolio user interfaces.
Figure 9B:
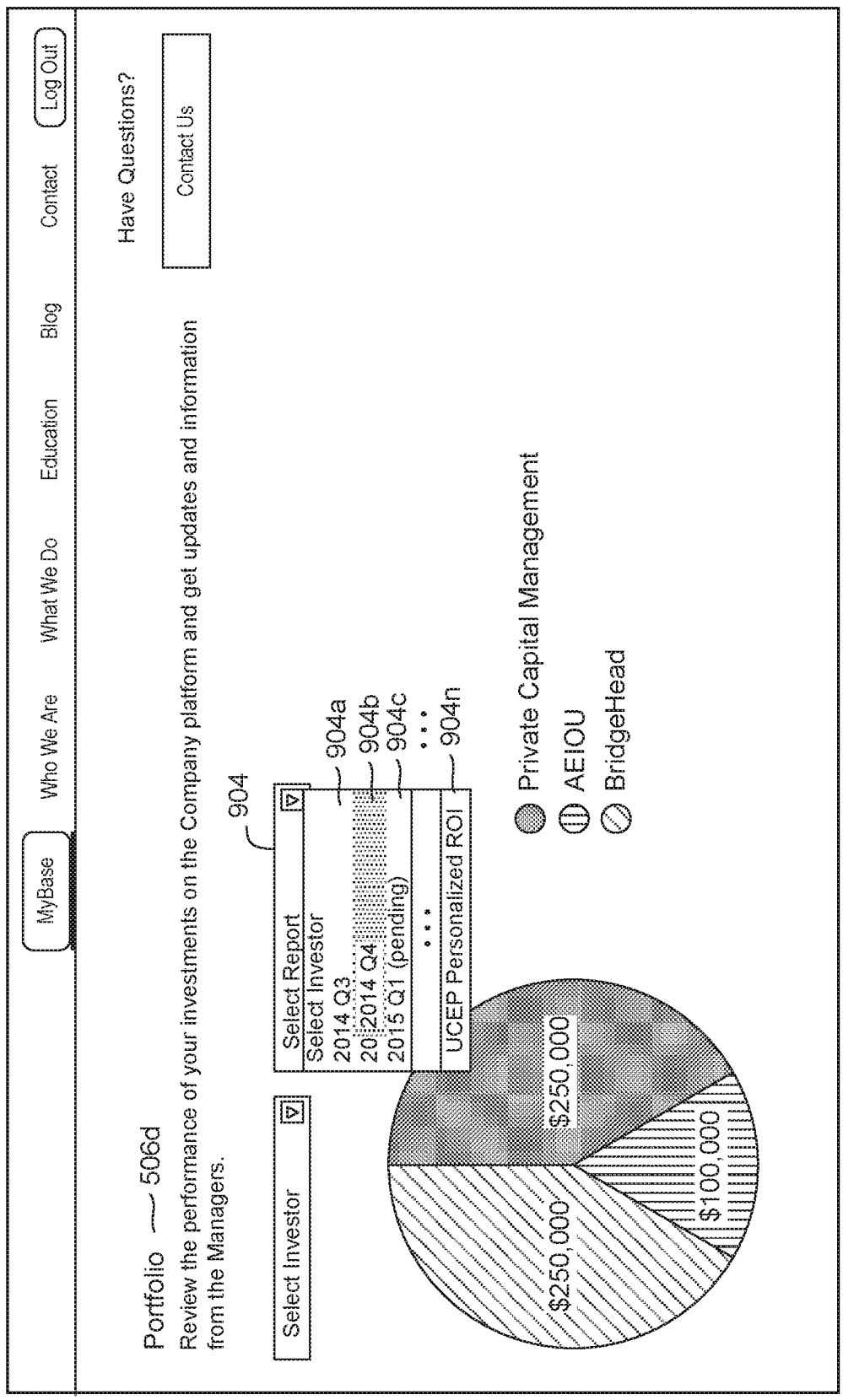

FIGS. 9A-9B depict exemplary portfolio user interfaces 900 implemented by UCEP for viewing, via investor profile menu 902, investor- and/or fund-specific reports via report menu 904. For example, referring to FIG. 9B, UCEP can generate various types of reports (e.g., quarterly reports 904a-904c, UCI ROI reports 904n, etc.) by selecting one of the reports via report menu 904.

Figure 10:
FIG. 10 is an example vault user interface.

FIG. 10 depicts an example vault user interface 1000 for displaying indicators 1004 for accessing some or all fund documents for each fund in an respective investor's portfolio 1002. For example, in FIG. 10, an investor's portfolio includes the Private Capital Management fund, AEIOU fund and BridgeHead fund, the documents of which are accessible (e.g., by selecting the library links 1006) in respective libraries for each fund, as described above.

Figure 11:
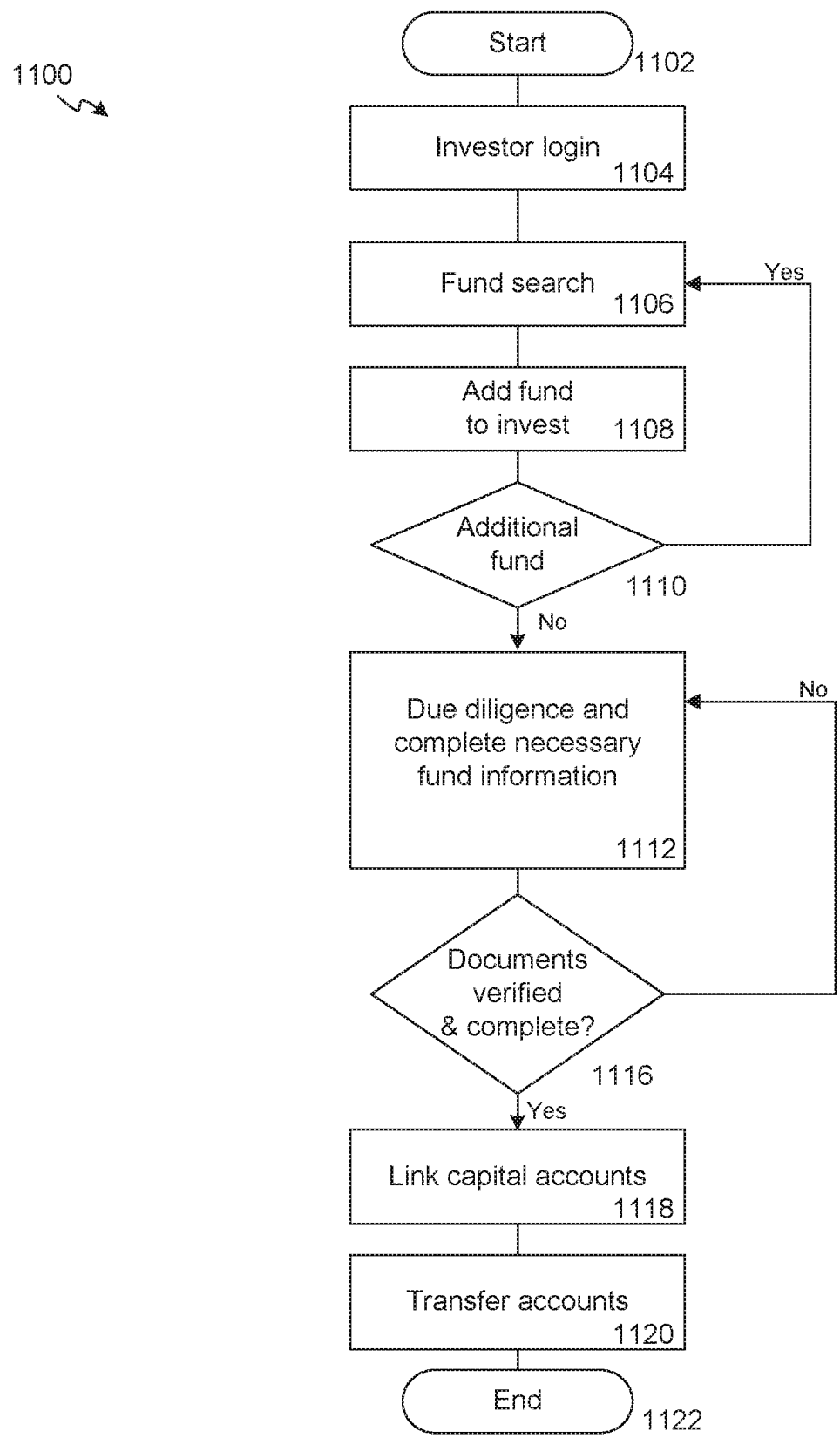
FIG. 11 is a flow diagram illustrating an example method for providing a private placement investment to an investor.

FIG. 11 is a diagram of an exemplary investor data flow 1100 that engages various components of the UCEP marketplace. In one or more embodiments, data flow 1100 can be some or all of an investor's workflow for investing in a fund. Data flow 1100 starts at step 1102, then proceeds to the investor login step 1104, where an investor logs into his/her account or sets up a new account in the marketplace. At step 1106, the investor searches for funds that meet the investor's criteria (e.g., a real estate fund with a high ROI) and at step 1108 adds that fund to the investor's portfolio or otherwise indicates an interest in the portfolio (e.g., by associating the fund as a personal "favorite"). At step 1110, the investor decides whether or not to add any additional funds for potential investment. For example, more than one fund may meet the investor's search criteria at step 1106 and, optionally, the investor can add this fund for further review. Additionally or alternatively, at step 1110, the investor may search for more funds by returning to step 1106. When all funds are added for further review, at step 1112, UCEP tools are provided for performing due diligence of each added fund. For example, UCEP tools can be engaged for reviewing, completing, and/or signing documents, as described above. At step 1116, UCEP determines whether all forms necessary to invest in at least one of the added funds have been completed by the investor (or the investor's agents) and verified as accurate and complete. If, at step 1116, UCEP detects that a document within a fund's workflow has not been properly completed (e.g., the investor has not completed all of the required blanks), the flow returns to step 1112. Otherwise, if one or more of the investor's capital accounts has not previously been linked (e.g., via APIs) to the investor's profile, at step 1118, UCEP establishes communication to third-party capital accounts for investing in one of the funds. At step 1120, capital is transferred from one or more of the third-party capital accounts into the UCEP marketplace (or, optionally, a separate escrow account or to the sponsor's designated capital account), and the investor is now invested in the one or more funds. The data flow ends at step 1122. One or more steps of data flow 1100 are not required for investing in a fund. For example, if the investor does not need to search UCEP for a fund (e.g., a fund was previously identified by the investor) and a capital account was previously linked (or the investor chooses to transfer money outside of UCEP), then steps 1006-1010 and 1018 are not necessary for investing in a fund.

Figure 12:
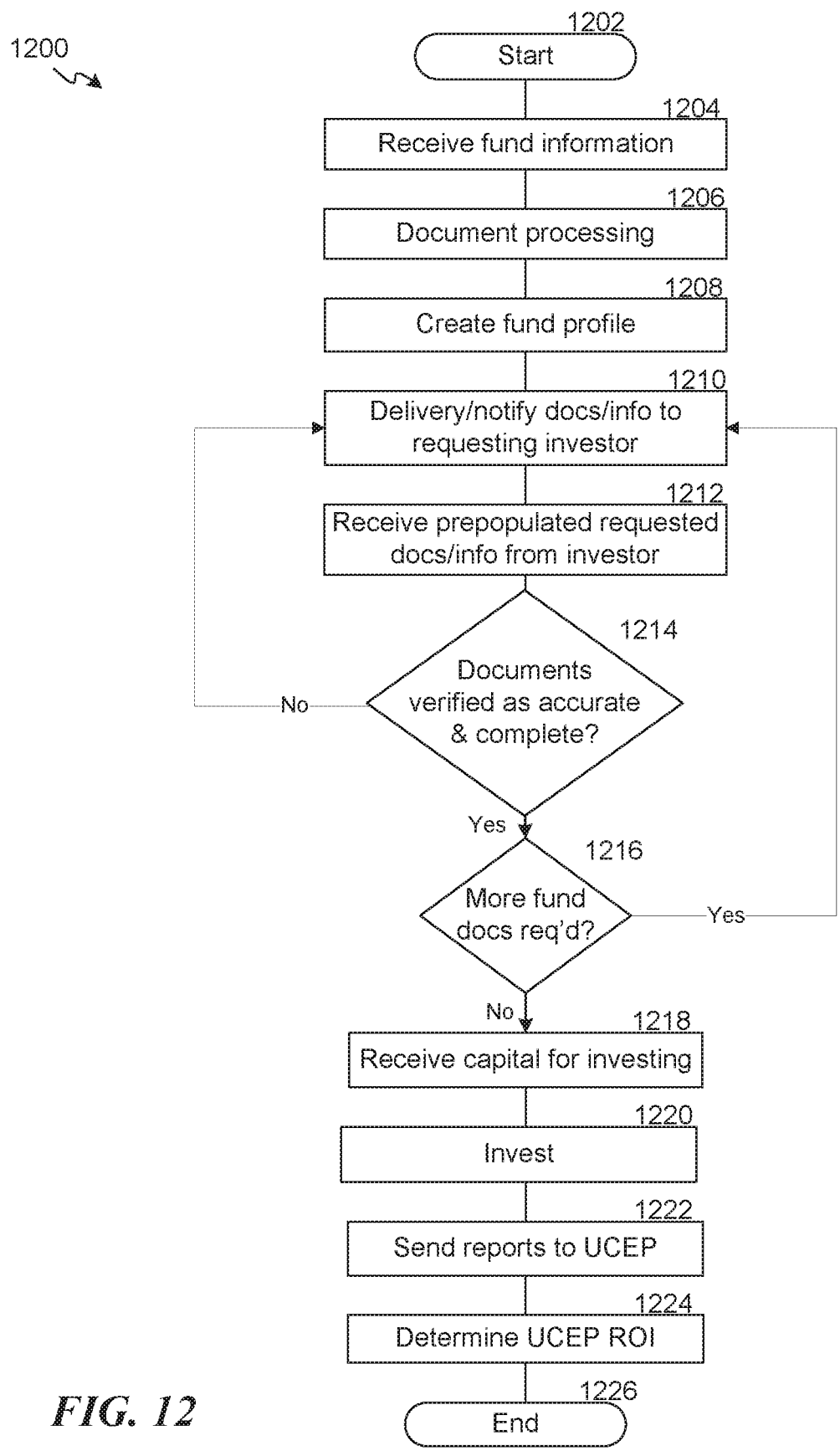
FIG. 12 is a flow diagram illustrating an example method for providing a private placement investment by a sponsor.

FIG. 12 is a diagram of an exemplary sponsor data flow 1200 that engages various UCEP marketplace components 302-326. Specifically, sponsor data flow 1200 describes various steps 1202-1226 for investing in a new fund. Some steps may be combined, and some steps are optional yet are shown to aid the reader in understanding various aspects of UCEP technology. The sponsor data flow 1200 starts at step 1202 and then proceeds to step 1204, where UCEP receives information for a new (or for modifying an existing) fund. For example, a sponsor can create a fund by uploading or sending links to fund documentation and filling out forms provided by UCEP. At step 1206, fund documentation is processed. For example, UCEP can analyze uploaded fund documentation to determine a document type (e.g., a prospectus, agreement, etc.); determine who needs to review the document (e.g., the investor and/or the investor's attorney, accountant, spouse, etc.); and identify what information is requested in the document (e.g., an investor's signature, account number, Social Security number, etc.) based on identifying signature blocks, blank spaces, or other identifiers within a document. At step 1208, UCEP generates a profile for the fund that determines the look and feel of the presentation of the fund within the UCEP marketplace, associates characteristics with the fund (e.g., the fund is a commercial real-estate fund investing in foreign multi-user apartment complexes, a tech-startup fund focused on medical devices, or a fund managed by three sponsors with a history in residential real estate investing in Arizona, etc.), generates one or more workflows associated with an ordering of steps required to invest in the fund (e.g., an investor must complete eight forms; however, forms 4-5 must be completed at the same time while form 7 must be completed only after forms 1 and 9 are executed). Workflows are adapted by UCEP to fit each individual investor based on, e.g., that investor's profile (and optionally the sponsor's profile). For example, a high-wealth individual may need to complete an extra form (e.g., to prove his/her wealth) that is not required by a mutual fund; therefore, UCEP will automatically create a step in the high-wealth individual's workflow to request that the extra form be completed in an order determined by the workflow. If the high-wealth individual is a citizen of a foreign country, as determined based on the investor's profile (for example), additional forms may be required and added to the foreign high-wealth investor's workflow. At step 1210, UCEP delivers and/or sends notification of available fund documents to a prospective investor. The investor can supply the requested information, the need for which can be emphasized to the investor. For example, the investor may be informed by UCEP (e.g., by narrative and/or highlighting) to sign page 3 of a document and initial page 4, and/or UCEP will automatically fill out the requested information based on the investor's profile (e.g., UCEP will automatically fill in an investor's Social Security number, account information, etc.). At step 1212, some or all of the requested documents are received, via UCEP, from the investor and, at step 1214, it is determined whether the documents are accurate and complete. If the documents are not accurate or complete, a notification and/or the requested document(s) are sent back to the investor at step 1210. Otherwise, if the documents are verified as accurate and complete, at step 1216, UCEP will, in one or more embodiments, determine whether any additional documents are required in an investor's workflow and, if so, will return the flow to step 1210. When all documents necessary for investing in the fund have been received and verified as accurate and complete, at step 1218, UCEP, in some embodiments, is configured to receive the investor's capital for investing in the fund (e.g., UCEP or a third party will escrow the capital) before the capital is ready to be invested, at step 1220. In some embodiments, after investment of step 1220, other actions are performed, such as receiving and/or sending financial statements and investment reports and determine investor-specific ROIs (as described above). The flow 1200 ends at step 1226, however, additional steps can be added and some are option (e.g., steps 1222-1224). These steps, among other features of UCEP, provide a centralized authority that injects reliability, stability, and transparency into the entire market of private placements.

Examples of the Unified Investment Management System

As described herein, in some embodiments, a unified investment management system facilitates the management, subscription, and/or presentation of investments and associated information. The system, which may be included within UCEP 300 or include various components of the UCEP 300 described herein, generates, maintains, and utilizes an investment-based data structure or index, where each entry of the data structure or index represents an investment managed by the system and includes information relating various aspects of an investment (e.g., fund, investor, and so on) with one another.

Figure 13:
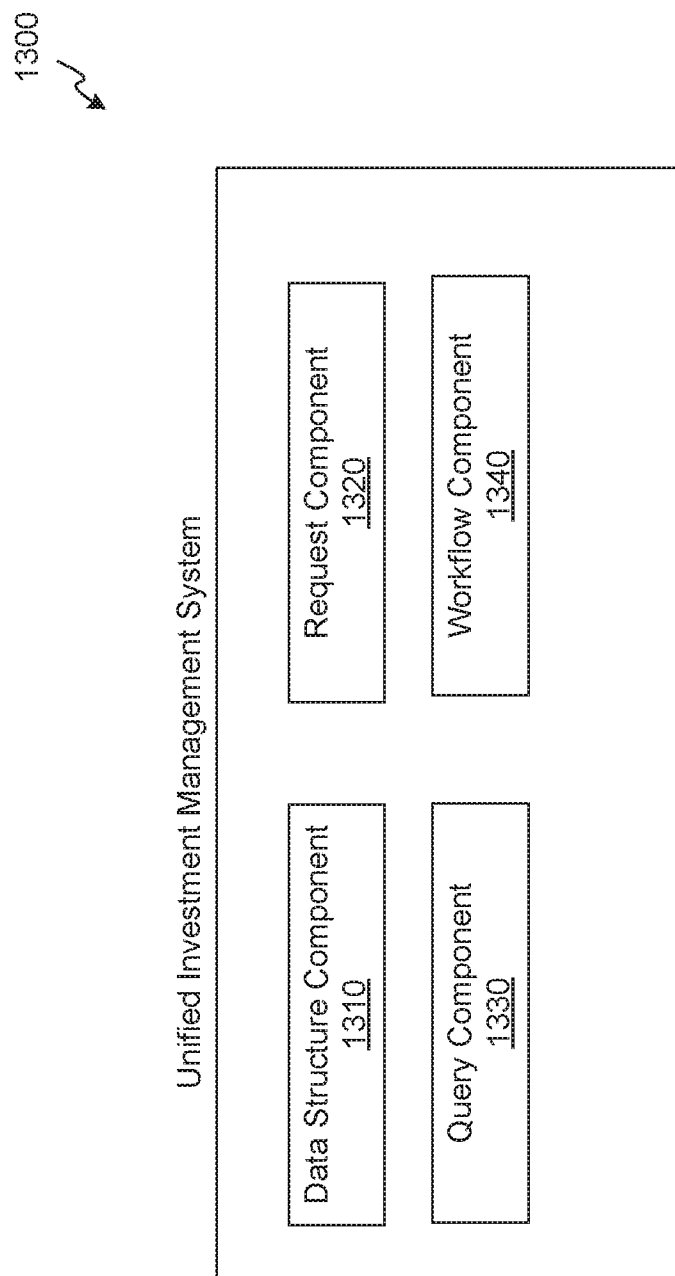
FIG. 13 is a block diagram illustrating various components of a unified investment management system.

FIG. 13 is a block diagram illustrating various components of a unified investment management system 1300. The system 1300 includes functional modules or components that are implemented with a combination of software (e.g., executable instructions, or computer code) and hardware (e.g., at least a memory and processor). For example, the system 1300 may include a data structure component 1310, a request component 1330, a query component 1340, and an information component 1340.

In some embodiments, the data structure component 1310 is configured and/or programmed to generate a data structure containing one or more entries, wherein each of the one of more entries is associated with an investment. For example, the data structure component 1310 may generate, update, and/or modify a data structure or other data object, such as a table, index, or database of records that each represent an investment, such as an investment asset or vehicle.

The data structure, or index, therefore, may be a collection of tags (e.g., metadata) applied to the data objects stored by the system 1300. For example, given a collection of data objects, such as investor data objects, entity data objects, sponsor data objects, vehicle data objects, document data objects, workflow result data objects, and so on, the index may tag one or more of the different data objects with other, related, data objects. The index, therefore, may represent a relational database of tagged objects, where each object may be associated with a tag to some or all of the other objects. In other words, the index relates the data as metadata to other data within the system.

The following is an example of a generated data structure or index of investment data:

| Investment ID | Fund | Investor | Document | Result/Status |
|---|---|---|---|---|
| Partners II Group | Key Offshore Capital Fund | Jones Abbott, Benson | Subscription1.pdf Offer.pdf | Signed Unsigned |
| Private three Housing Dev | Startup Community | Morris Jones | Compliance.pdf Offer.pdf | Signed unsigned |

Therefore, the data structure relates various different types of information associated with an investment, such as an investment shared by many investors, a private a private placement investment, a real estate investment, and so on. Each entry of the data structure may include some or all of the following information or data:

An identifier for the investment;
Information representative of a fund associated with the investment;
Information representative of a user associated with the investment;
Information or a link to one or more documents that represent a result of business logic applied to the data (e.g., subscription logic result of an investment between the fund associated with the investment and the user associated with the investment);
Information or a link to a signature or acceptance documents associated with the investment;
Information identifying a current result or status of a workflow associated with an investment or other related data (e.g., unsigned document, accepted terms, and so on);
Information associated with permissions, authorizations, or security applied to the data;
Information representing user-provided inputs or information (e.g., electronic signature files, identification files or documents, verification files, user relationships, and so on; and/or other information, tags, or metadata.

In some cases, the system may create additional records based on the data within the data structure. For example, when updating an entity record, the system 1300 may retrieve an updated value after a business process or workflow, update the index with the new value, and provide the new value to a record or document.

Thus, an entry in the data structure or index, for a given investment or vehicle, may include an identifier for the investment, the name of a fund managing the investment, the name(s) of investors to the fund, information representing documents associated with the vehicle, information associated with workflows performed or currently being performed for the vehicle, information identifying statuses or results for various processes of the workflows, and so on.

The investment-based data structure, therefore, may act as a queryable data object, data structure, index, and/or relational database for the system 1300, enabling the system 1300 to quickly and efficiently manage, retrieve, obtain, and/or access data stored by the system 1300, and provide the data to various workflows managed by the system 1300.

The system 1300 may receive and store the data from various sources. For example, the system 1300 may receive data input from users, fund managers, administrators, and so on, may extract data from documents stored with the system 1300, may retrieve or access data from various third party services or entities, and so on.

In some embodiments, the request component 1320 is configured and/or programmed to receive a request (e.g., via a user interface provided by the unified investment management system 1300) perform actions associated with stored data. As described herein, the actions may be actions to dynamically generate workflows, such as workflows that track, manage, and/or display information associated with investments managed by the unified investment management system 1300.

For example, the system 1300, via various selectable user interface elements (e.g., displayed menus, filters, buttons, and so on), may receive input from users associated with requests for information. The requests may be associated with displaying certain types of information, rendering or publishing graphical data analyses, rendering or publishing documents associated with the investments (e.g., completion documents, subscription documents, compliance information, and so on), beginning or completing workflows, and so on. Further details regarding the different types of user interfaces provided by the system 1300 are described herein.

In some embodiments, the query component 1330 is configured and/or programmed to query the generated data structure or index to identify information associated with the investments managed by the unified investment management system 1300, such as information that satisfies a received request. The query component 1330 may query the information stored in the data structure provided herein to identify one or more investments and related information (e.g., tags or metadata) for certain query terms and values. For example, a query using the term investor=Jones may provide results identifying the investments owned or held by the investor named Jones, and/or the information related to the name Jones within the data structure.

The query component 1330, therefore, may query the entries of the data structure to identify investments and/or other data tagged with information representative of the specific fund identified in the received request, investments tagged with information representative of the specific investor identified in the received request, workflows associated with the investment or tagged data, and so on.

In some embodiments, the workflow component 1340 is configured and/or programmed to dynamically generate or modify workflows associated with investments managed or tracked by the system 1300. The workflow component 1340, for example, may render or publish various different interfaces resulting from workflows, such as fund interfaces that present information satisfying the request, investor interfaces that satisfy the received request, and so on. The workflow component 1340, therefore, may cause the system 1300 to present a fund profile interface that displays investments managed by a specific fund, including information tagged to the investments, an investor profile interface that displays investments held by a specific investor, including information tagged to the investor, a management profile interface that displays funds managed by a specific management company, including information tagged to the management company, and so on.

As an example, the system accesses an index of information tagged to a specific investor (e.g., metadata currently assigned or associated with the investor), and renders an investor profile that includes a display that identifies the various associations or relationships between the investor and other data objects managed by the system 1300. The display may include, for example, funds owned by the investor, in progress workflows that include the investor, and status information regarding compliance documents stored by the system 1300 for the investor.

In addition, the workflow component 1340 may perform various actions associated with dynamically generating or modifying workflows, such as actions to generate or complete forms or documents, such as investment subscription forms, investment completion forms, signature forms, compliance forms, and so on. For example, the workflow component 1340 may inject investment data into different logic algorithms to calculate information used to populate a digital document, such as a document that represents a subscription to an investment by a potential investor, and stage or render the populated digital document for viewing via the interface.

Figure 14:
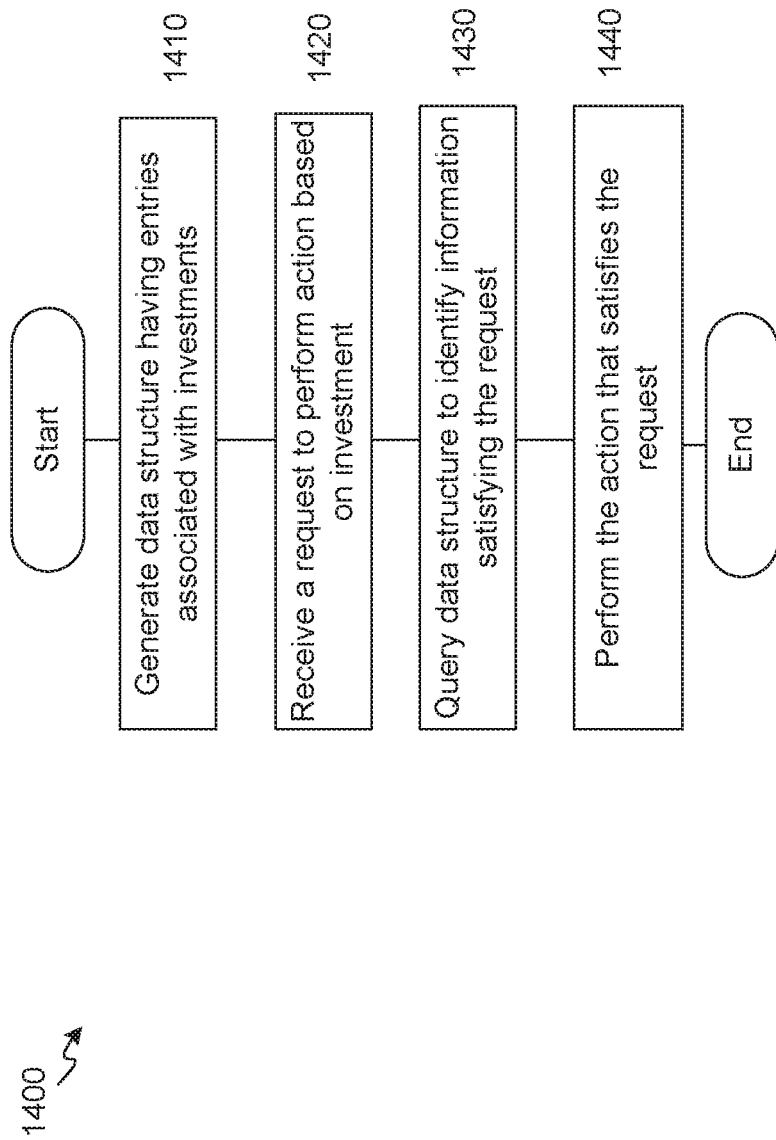
FIG. 14 is a flow diagram illustrating a method for performing actions associated with one or more investments.

Thus, as described herein, by providing a specifically configured data structure of investment information (such as a tagged index), the system 1300 is capable of presenting various different views of information associated with the investments, regardless of the complexity of relationships between the parties and entities associated with the investments, among other benefits FIG. 14 is a flow diagram illustrating a method 1400 for performing actions associated with investment data stored by the system 1300. The method 1400 may be performed by the system 1300 and, accordingly, is described herein merely by way of reference thereto. It will be appreciated that the method 1400 may be performed on any suitable hardware.

In operation 1410, the system 1300 generates a data structure or index containing one or more entries, where each of the one or more entries is associated with an investment. For example, the generated data structure, as described herein, may include entries that relate an identifier for the investment, information representative of a fund associated with the investment, information representative of a user associated with the investment, information or a link to one or more documents that represent a subscription of the investment between the fund associated with the investment and the user associated with the investment, information or a link to a signature or acceptance documents associated with the investment; and/or other information, and so on.

In operation 1420, the system 1300 receives a request to perform an action associated with investments managed by the unified investment management system 1300. For example, the system 1300, via various selectable user interface elements (e.g., displayed menus, filters, buttons, and so on), may receive input from users associated with requests for information or actions. The requests may be associated with displaying certain types of information, rendering or publishing graphical data analyses, rendering or publishing documents associated with the investments (e.g., completion documents, subscription documents, compliance documents, and so on), starting or continuing workflows related to producing records associated with investments, and so on.

In operation 1430, the system 1300 queries the generated data structure to identify information associated with the investments managed by the unified investment management system, such as for data that satisfies a received request. For example, the query component 1330 query the entries of the data structure to identify investments tagged with information representative of the specific fund identified in the received request, investments tagged with information representative of the specific investor identified in the received request, and so on.

In operation 1440, the system 1300 performs an action using the identified information, such as an action that presents the identified information that satisfies the received request, via one or more dynamically generated profiles based on metadata associated with the query. For example, the workflow component 1340 may cause the system 1300 to present a fund profile interface that displays investments managed by a specific fund, an investor profile interface that displays investments held by a specific investor, a management profile interface that displays funds managed by a specific management company, and so on.

In some embodiments, as described herein, the system 1300 may utilize various logic algorithms (e.g., rules, applied formulas, routines, and so on) to determine values or other results as part of workflow operations. For example, the system 1300 may obtain data associated with a statement for an investment (e.g., investor information and ownership percentages), apply specific logic (e.g., a fee structure) and determine fees to be assigned to the various investors (or, fund balances). The system 1300, therefore, stores various types of logic (e.g., capital management logic, allocation logic, fee logic, process management logic, and other business or calculation specific logic), which may be utilized when completing various transactions, tasks, operations, and/or other workflow processes.

Therefore, the system 1300 provides users (e.g., investors, fund managers, and so on) with various profiles or views into a large amount of data associated with investments and various entities that own, hold, and/or manage the investments. Via the platform described herein, which, in some embodiments, obtains data (and various tagged relationships) to be presented via the investment-based data structure, a user/manager may navigate various profiles to view information associated with investments, search for new investments, populate and generate documents, store documents and other data, dynamically generate and modify workflows, and so on. The following user interfaces illustrate the various types of profiles and other information that may be displayed or presented by the system 1300.

Figure 15A:
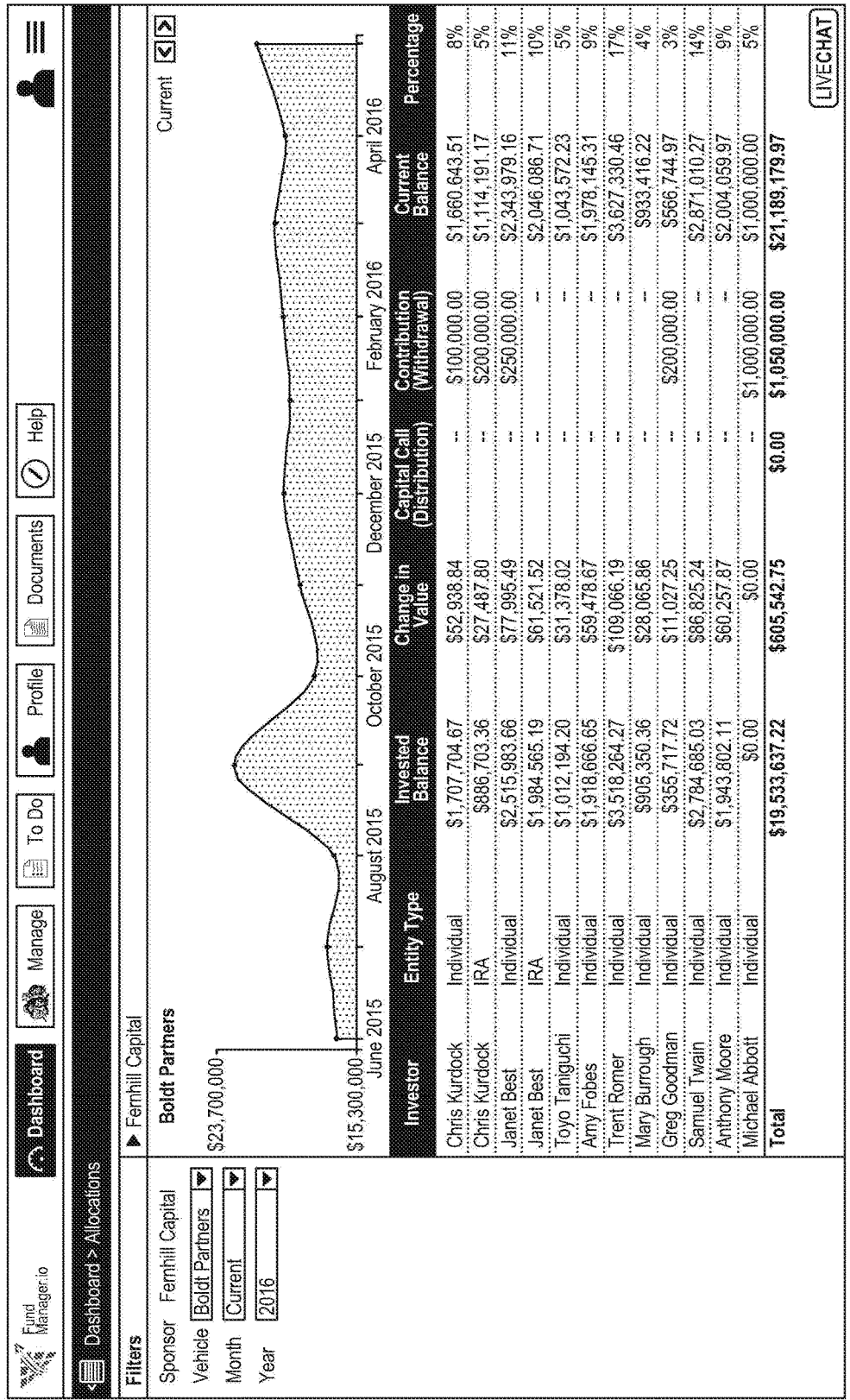

FIG. 15A is an example user interface 1500 of a fund profile, which displays information associated with investment allocations for the fund. As described herein, the system 1300 may obtain the depicted information by querying the data structure with the name or another identifier for the fund, and render the interface 1500 accordingly.

Figure 15B:
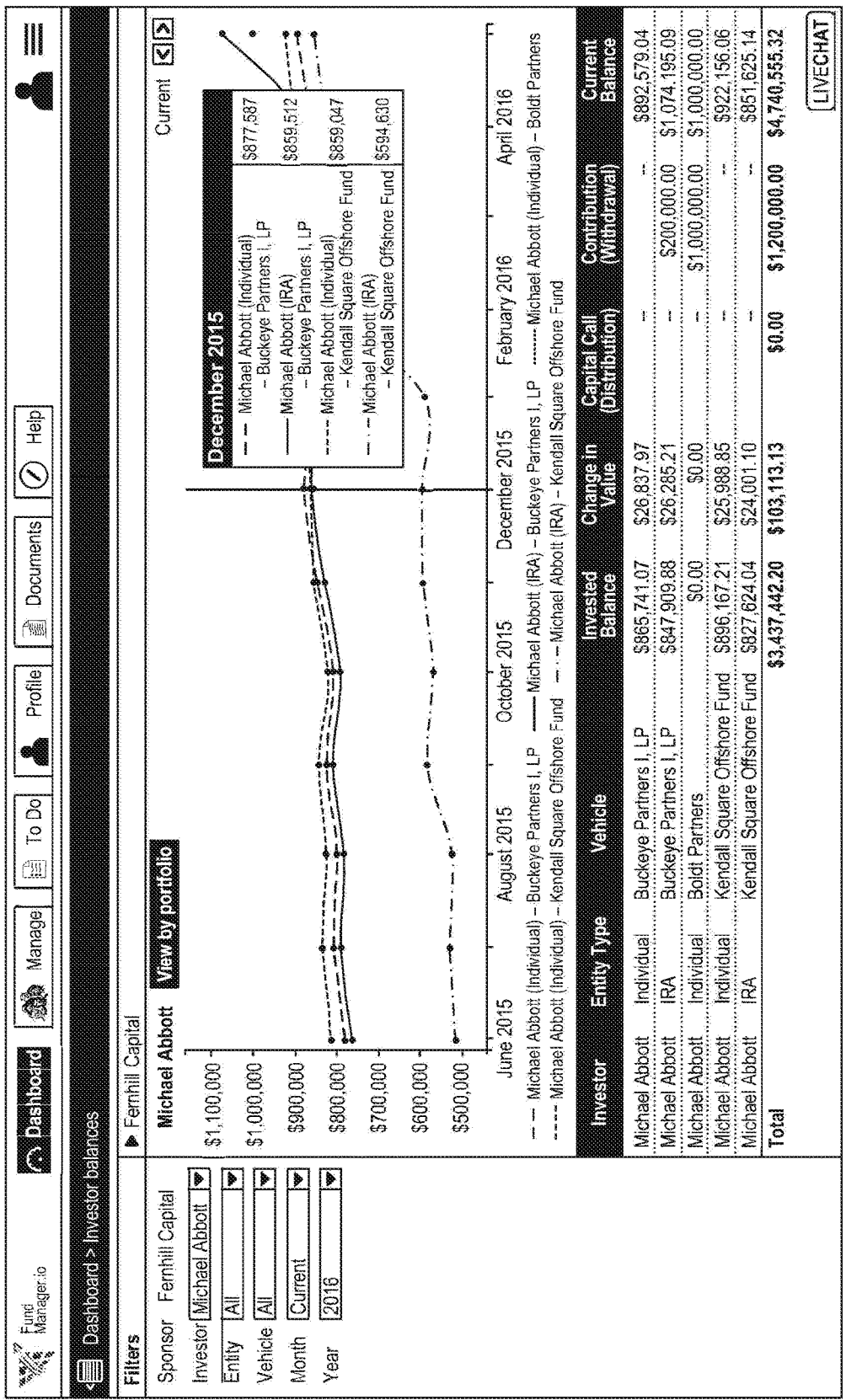

FIG. 15B is an example user interface 1510 of an investor profile, which displays information associated with alternative investments held by the investor. As described herein, the system 1300 may obtain the depicted information by querying the data structure with the name or another identifier for the investor, and render the interface 1510 accordingly.

Figure 15C:
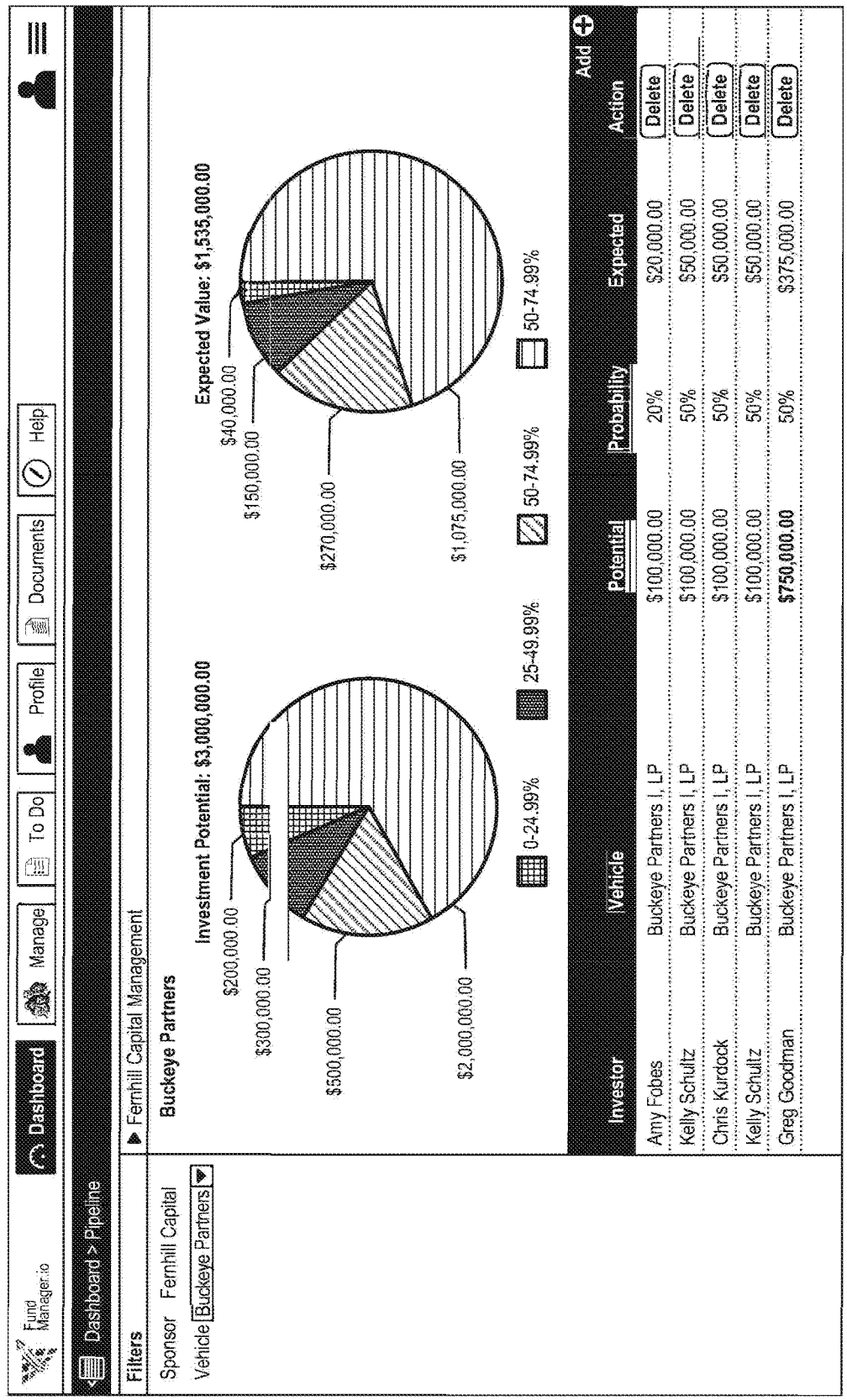

FIG. 15C is an example user interface 1520 of an investment profile, which displays information associated with investors of a certain investment (e.g., a specific private placement investment). As described herein, the system 1300 may obtain the depicted information by querying the data structure with the name or another identifier for the sponsor of the investment, and render the interface 1510 accordingly.

FIG. 15D is an example user interface 1530 of a manager profile, which displays information associated with investment vehicles managed by a certain manager. As described herein, the system 1300 may obtain the depicted information by querying the data structure with the name or another identifier for the manager, and render the interface 1510 accordingly.

FIG. 15E is an example user interface 1540 via which users may access service providers. As described herein, the system 1300 may obtain the depicted information by obtaining information related in the data structure to various investment vehicles and sponsors, and render the interface 1510 accordingly.

FIG. 15F is an example user interface 1530 of active actions, or "to-dos," managed by the system 1300. As described herein, the system 1300 may obtain the depicted information by obtaining information related in the data structure to a specific user, and render the interface 1510 accordingly.

As described herein, the system 1300 may assist in various work flows associated with investor subscriptions of investments. FIGS. 16A-16F are example user interfaces presented during completion of a subscription of an investment.

Figure 16A:
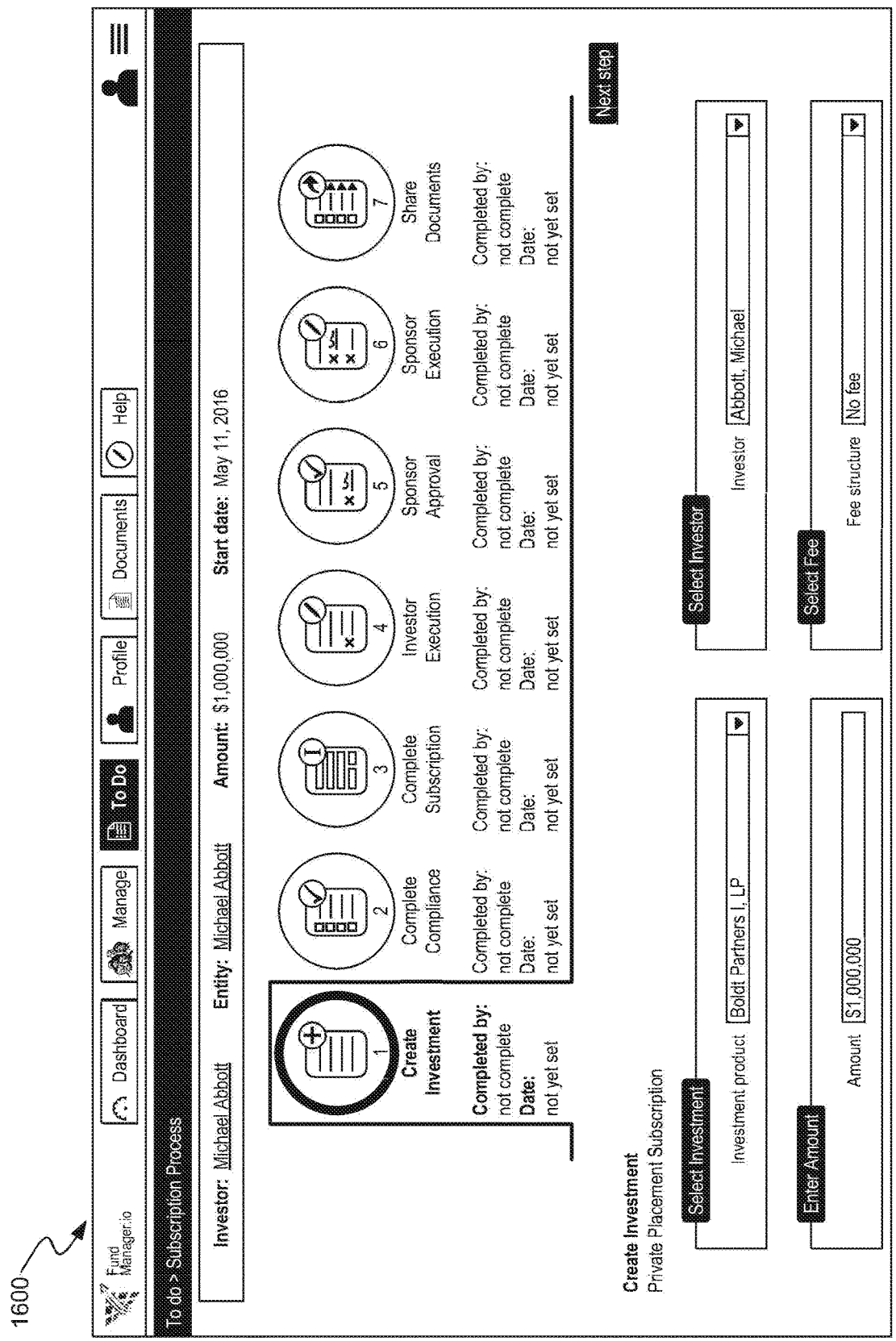
Figure 16B:
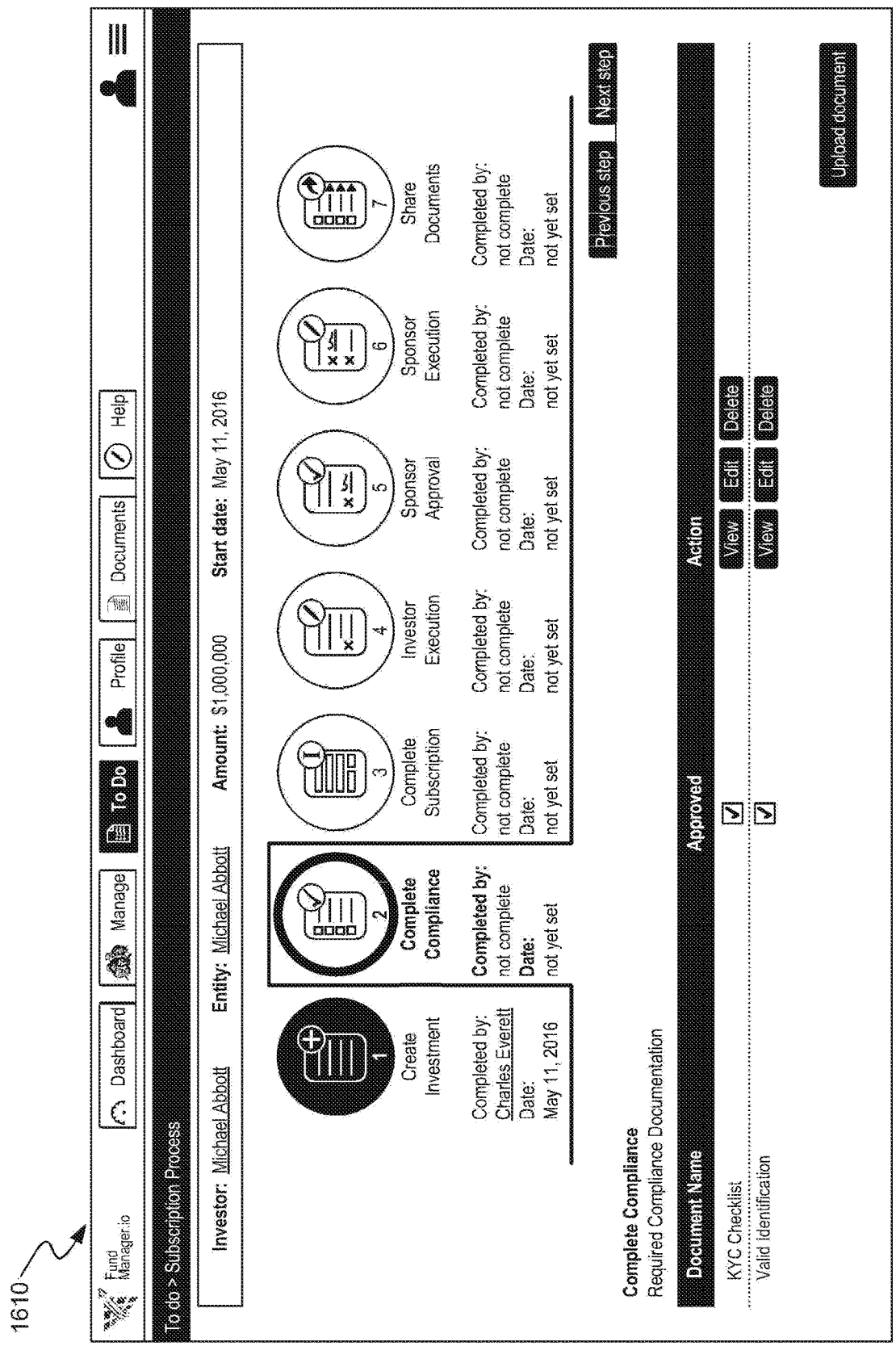
Figure 16C:

For example, FIG. 16A is an example user interface 1600 via which a user (e.g., investor) may initiate a subscriber workflow. FIG. 16B is an example user interface 1610 via which the system 1300, by querying the data structure, manages compliance actions associated with investment subscriptions. FIG. 16C is an example user interface 1620 depicting the system 1300 populating a subscription form via data obtained or identified via the data structure.

Figure 16D:
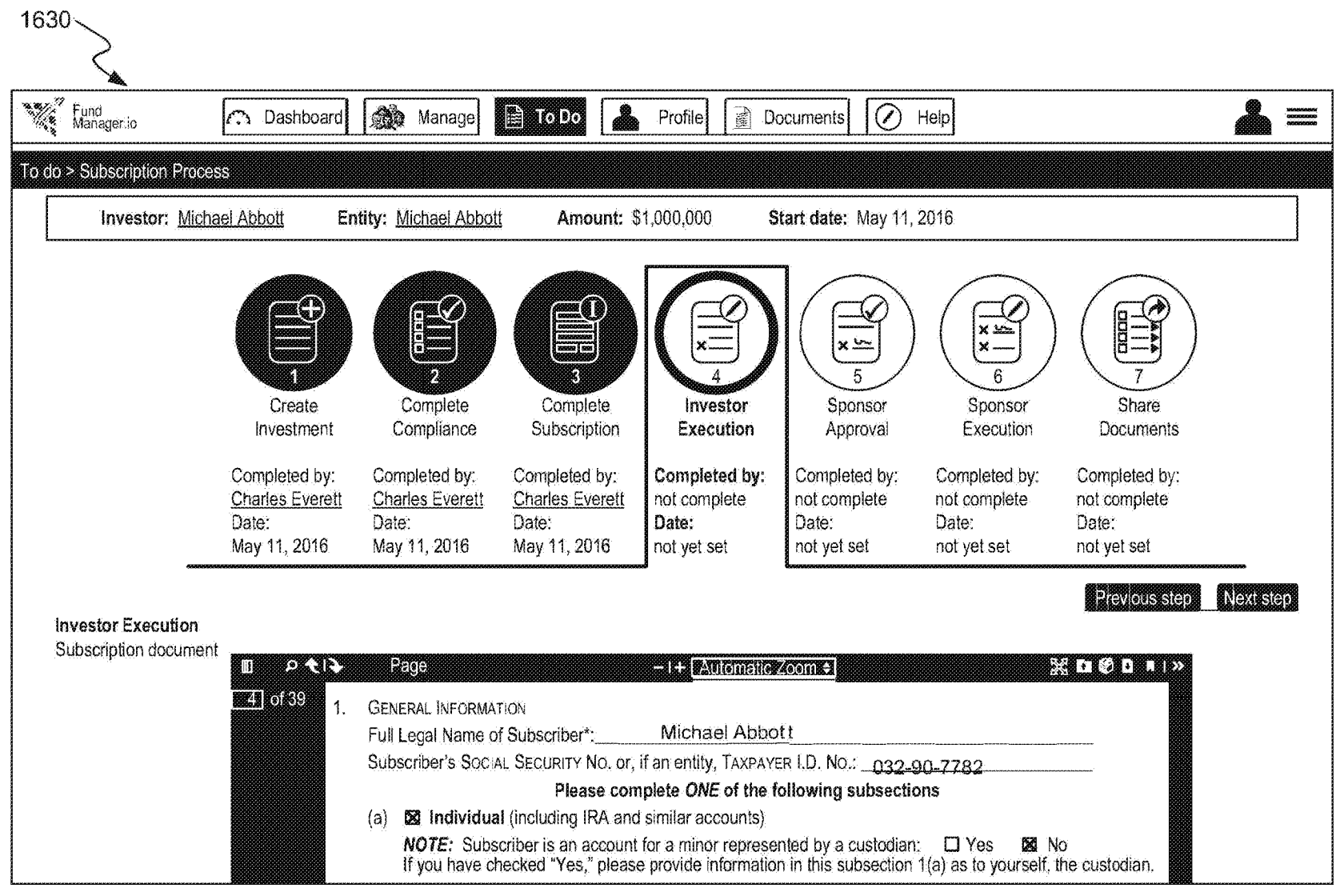
Figure 16E:
Figure 16F:
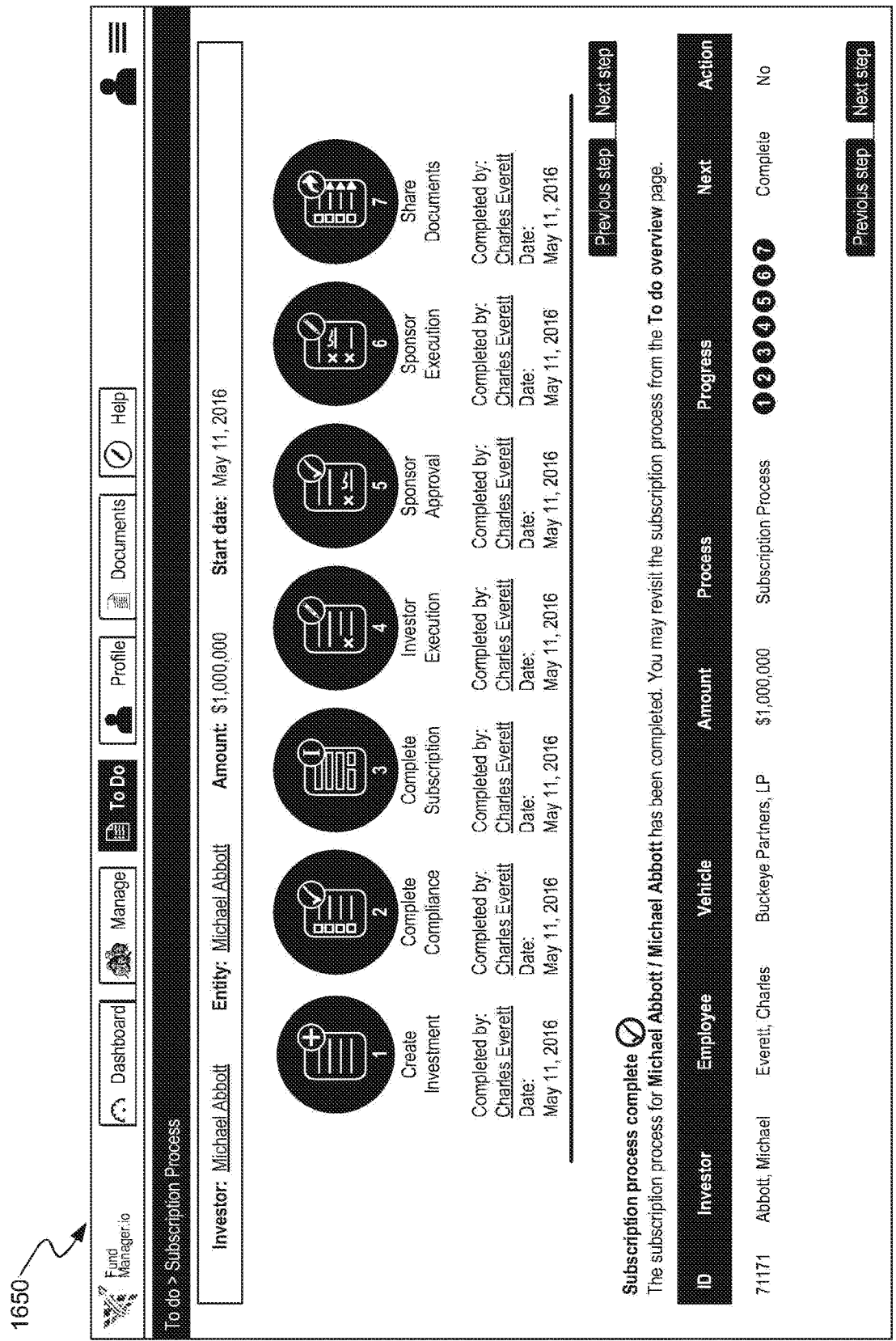

FIG. 16D is an example user interface 1630 depicting the system 1300 rendering a legal document based on the populated subscription form. FIG. 16E is an example user interface 1640 depicting the system 1300 sharing the rendered legal document with other parties managed by the system 1300. FIG. 16F is an example user interface 1650 depicting a status of the investment subscription work flow.

Of course, the system 1300 may provide other user interfaces, such as interfaces configured to display information managed by the system, interfaces configured to add or remove information, and so on. For example, FIG. 17A is an example user interface 1700 depicting a management company profile that displays information associated with different managed funds. As another example, FIG. 17B is an example user interface 1710 via which a user may select an investment vehicle and view detailed information about the investment and relationships to investors, managers, and so on. FIG. 17C is an example user interface 1720 via which a user may select an investor and view detailed information about the investor and his/her relationships with various investment vehicles.

Figure 18A:
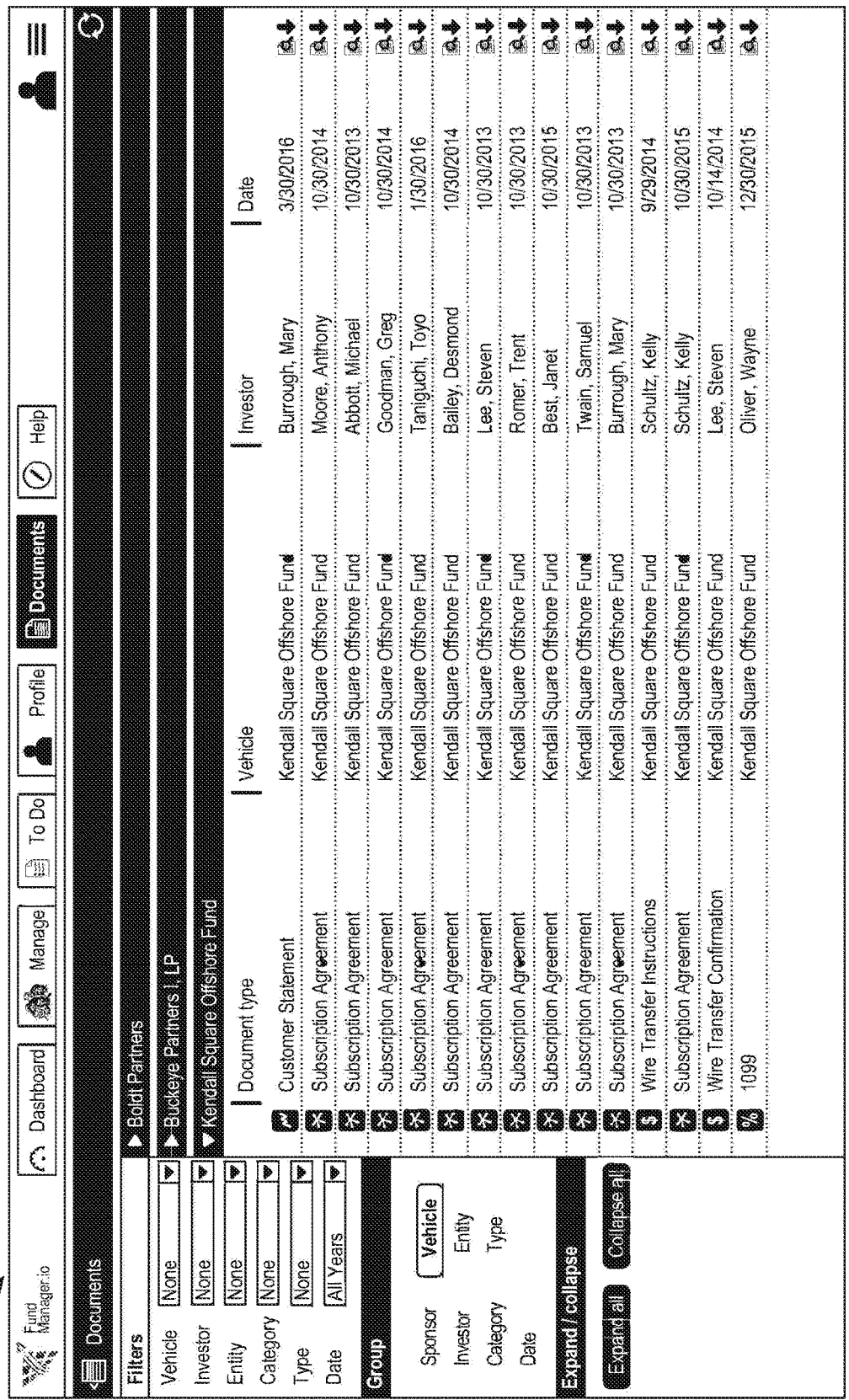

FIG. 18A is an example user interface 1800 depicting the contents of a document vault managed by the system 1300. As depicted, via the data structure described herein, the system 1300 may identify, obtain, and present information for each of the stored documents, such as the fund associated with the document, the investor associated with the document, the date/time when the documents was generated or completed, and so on. In some cases, the user interface may stage or provide preview versions or displays of documents or information before or during the completion of document uploads.

Figure 18B:
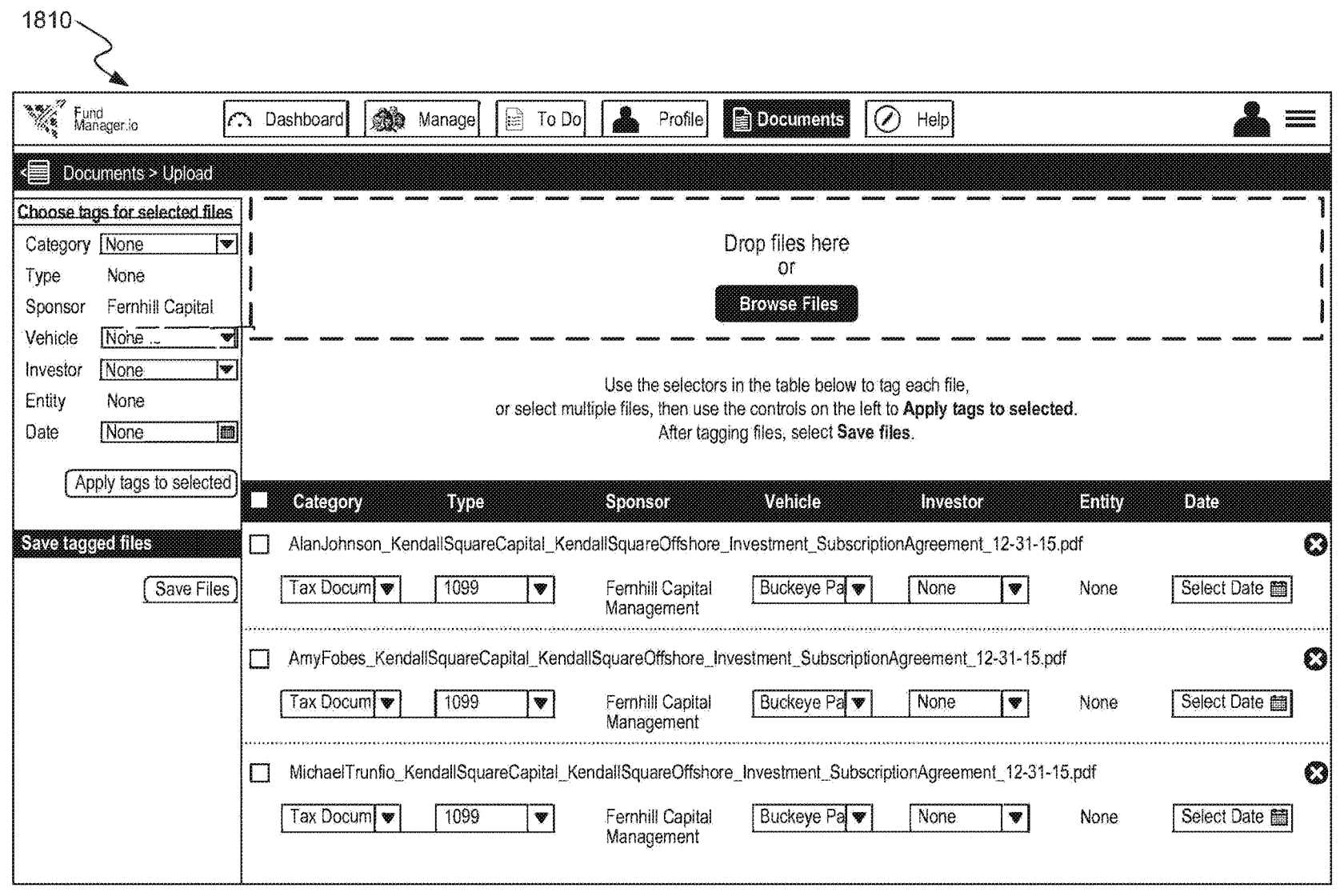

FIG. 18B is an example user interface 1810 depicting an upload interface that facilitates the uploading of documents to the document vault managed by the system 1300. As depicted, the user interface 1810 provides user-selectable elements configured to tag documents with metadata. These elements, or tools, may facilitate bulk-tagging of documents, individual tagging of documents, and so on. Once tagged, the documents, metadata, and associated investment data may be added to the data structures described herein.

For example, when a document is stored or uploaded to the data vault (via various upload mechanisms), the system 1300 may tag the document with various metadata associated with the document, such as metadata associated with an entity, sponsor, vehicle, document, workflow result, and so on. The system 1300 may then identify, sort, filter, and/or find documents via the tagged metadata.

Therefore, in some embodiments, the system 1300 creates and maintains a data structure or other data object for all investments managed by the system 1300. The data structure includes an entry for each investment under management, where each entry includes an identifier for the investment, information representative of a fund associated with the investment, information representative of a user associated with the investment, and other related information. Using the data structure, the system 1300 is capable of quickly and efficiently rendering various different profile views of the large amounts of data managed by the system, such as fund profiles, investor profiles, and so on.

Use Cases for the Unified Investment Management System

As described herein, the unified investment management system 1300 maintains alternative investment data in various indexed relationships, and performs various actions associated with the indexed data, such as workflow steps or processes that would be too cumbersome or inefficient to perform without the indexed data, among other benefits For example, the following workflows may perform operations using indexed data:

Capital Statement generation, where investor information and fund performance information is obtained and presented via one or more views. For example, the workflows may utilize the data when automatically generating capital statements (e.g., including commentary) and distributing (e.g., a mail merge of unique investor specific information with overall fund performance information), staging, and/or displaying the statements;

Investment tracking, where an investment may be tracked and managed from the initial identification of potential investors (e.g., via prospect profiles that identify investors, probability of investments, potential investment amounts, and so on) for a fund of vehicle, the various workflows associated with generating records for a completed investment transaction, the performance of the investment, compliance or maintenance information, and so on;

Compliance records generation, such as information useful to an investor for providing fiduciary oversight and related information;

Private Placement Investment management, where the workflows (as described herein) may initiate a capital call from a financial account (with or without approval), based on the completion of a document signing;

Capital Call and Distribution Processes, where the system 1300 stores the financial account information for the sender and recipient of money; enables either party to update their financial account information and/or designate multiple accounts for different purposes; manages the business logic and workflow for money movement from the sender to recipient; utilizes ACH or other methods to transmit the money; initiates money movement based on the completion of capital calls, streamlines interactions with foreign investors; and so on;

Audit Processes, where the system 1300 stores historical log/audit trail information (e.g., information involving pre-financing interactions, due diligence review, compliance, and so on) that tracks the investor/manager/user access of data by viewing, editing, downloading, and so on, within the system 1300. The system, therefore, may utilize the related data to review data, metadata and logic, date stamps, user interactions (locations and time periods) within the system, compliance dates, reporting dates, and other information, events, or actions; and so on.

In some embodiments, the system 1300 may forecast future performance and cash flows for investments, vehicles, funds, and other data objects. The system 1300 may utilize stored information to forecast future results given past results; forecast results at fund levels; forecast events at fund and investor levels, forecast events at group of funds levels/aggregated levels, determine recommendations for target market/investors based on tracked or determined benchmarks (e.g., age, location, strategy, investor type, historical occurrences, and so on).

For example, the system 1300 may perform aggregated portfolio forecasting, where the data relationships generated and maintained by the system 1300 include specific capital call and distribution data and performance data. Using the data, the system 1300 may forecast and/or present performance information based on the storage of specific and general characteristics for private placement investments, and/or forecast and/or present future capital call and distribution information based on the storage of specific and general characteristics for private placement investments, among other information.

In some embodiments, the system 1300 may collaborate, integrate, or exchange information with various third party systems, such as fund accounting systems. The collaboration may facilitate the storage and access to performance data/reports, the delivery performance reporting data/reports along with the related distributions as described herein, the delivery of performance reporting data/reports to third party reporting systems (e.g., Adepar, Advent/Blackdiamond, and so on). The delivery may be via manual processes, export, email, APIs, system integrations, and so on.

For example, the system 1300 facilitates the exchange or sharing of investment opportunities via third party marketplaces that provide investments available to various audiences, such as crowd fund groups, institutional investors, and so on. In some cases, the third party systems may utilize various components or processes described herein, such as transactions, investments, compliance processes, and so on.

In order to exchange information, the system 1300, in some embodiments, publishes and/or provides APIs, which provide third party systems with access to data, processes, workflows, and so on, provided by the system. Via the APIs, the system 1300 enables data to be imported from or exported to third parties, which may speed up, increase the accuracy of, and/or increase the scope of various reporting processes of financial data, performance data, compliance data, and so on.

APIs may also facilitate third party partnerships, which may enable investment approval by certain financial platforms, enable investment by approved third parties (e.g., service providers, authorized users, and so on), sharing of data or documents with approved third parties, and so on. The system 1300, therefore, may act to manage or provide data to many different parties internal and/or external to the system 1300.

Examples of User Experience Functions of the Unified Investment Management System In some cases, the system 1300, via various user interfaces, may provide notifications to users. The notifications may include: alerts associated with workflow activities, alerts associated with investment events, alerts associated with changes or modifications to documents or workflows, and so on.

Additionally, the system 1300 may provide various communication mechanisms to facilitate the exchange (e.g., internal to the system 1300) between investors and/or fund managers. Example mechanisms may include chat boxes, notation or annotation recording, emails, instant messaging, voice communications, document sharing, and so on. As described herein, the system may tag any or all recorded messages or communications to the various associated entities, and record the tags in the indexes described herein. Thus, in some embodiments, the system 1300 described herein manages investment data, such as data associated with alternative investments, via one or more indexes or other data structures that maintain relationships between various data objects. Via these data relationships, the system 1300 may generate or provide information to workflows (which may generate documents or records), render and present various profiles of information, and so on.

CONCLUSION

In general, the detailed description of embodiments of the described technology is not intended to be exhaustive or to limit the described technology to the precise form disclosed above. While specific embodiments of, and examples for, the described technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors.

A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.

The term "logic" and "components" as used herein, can include, for example, special-purpose hardwired circuitry, software, and/or firmware in conjunction with programmable circuitry, or a combination thereof.

These and other changes can be made to the described technology in light of the above Detailed Description. While the above description details certain embodiments of the described technology and describes the best mode contemplated, no matter how detailed the above appears in text, the described technology can be practiced in many ways. The described technology may vary considerably in its implementation details, while still being encompassed by the described technology disclosed herein. As noted above, particular terminology used when describing certain features or aspects of the described technology should not be taken to imply that the terminology is being redefined herein to be restricted to any specific characteristics, features, or aspects of the described technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments but also all equivalent ways of practicing or implementing the described technology.

To reduce the number of claims, certain aspects of the described technology are presented below in certain claim forms, but the applicant contemplates the various aspects of the described technology in any number of claim forms. For example, while only one aspect of the described technology is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for," but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A workflow data management system for verifying compliance to workflows, comprising:
    a memory; and
    at least one processor configured to perform steps comprising:
        receiving information via a first graphical user interface, the information comprising a request, the request comprising a user's information associated with a user;
        generating a workflow in an investment management system or a fund management system, wherein the workflow is associated with a set of documents and is based on the request;
        receiving a data object generated by the workflow, wherein the data object is associated with an investment;
        creating one or more records within a data structure based on the data object;
        querying the data structure to identify a tag associated with the data object based on the request, wherein the data structure comprises a collection of tags associated with respective data objects stored in the data structure;
        providing, to the workflow, information indicative of relationships between the data objects stored in the data structure based on the collection of tags;
        determining, based on the tag, a related data object comprising at least one of a progress workflow associated with an investor of the investment, a fund owned by the investor, and a compliance document;
        selecting a document of the set of documents based on the request, the information indicative of relationships between the data objects, and the related data object, wherein the selected document needs to be executed by the user;
        automatically populating the selected document with data comprising the one or more records;
        providing, via a second graphical user interface, the populated document;
        calculating, based on the user's information, the request, and the related data object, a return on investment for the user;
        receiving, via the second graphical user interface, a completed version of the populated document;
        performing character recognition on the completed version of the populated document to verify that the user properly completed the populated document;
        based upon determining that the completed version of the populated document lacks required information, prompting a party to enter missing data; and
        upon determining that the completed version of the populated document is properly completed, initiating money transfer based on progression of the workflow.

2. The system of claim 1, wherein the steps further comprise querying the data structure based on a filter associated with the request.

3. The system of claim 1, wherein the request comprises a document uploaded via the first graphical user interface.

4. The system of claim 3, wherein the steps further comprise:
    rendering an input interface configured to receive tags input by the user and associated with the document; and
    associating the one or more generated record with the document and the received tags.

5. The system of claim 1, wherein the steps further comprise populating the document with metadata associated with the one or more data records.

6. A computer-implemented method for verifying compliance to workflows, the method comprising:
    receiving information via a first graphical user interface, the information comprising a request, the request comprising a user's information associated with a user;
    generating a workflow in an investment management system or a fund management system, wherein the workflow is associated with a set of documents and is based on the request;
    receiving a data object generated by the workflow, wherein the data object is associated with an investment;

creating one or more records within a data structure based on the data object;
querying the data structure to identify a tag associated with the data object based on the request, wherein the data structure comprises a collection of tags associated with respective data objects stored in the data structure;
providing, to the workflow, information indicative of relationships between the data objects stored in the data structure based on the collection of tags;
determining, based on the tag, a related data object comprising at least one of a progress workflow associated with an investor of the investment, a fund owned by the investor, and a compliance document;
selecting a document of the set of documents based on the request, the information indicative of relationships between the data objects, and the related data object, wherein the selected document needs to be completed by the user;
automatically populating the selected document with data comprising the one or more records;
providing, via a second graphical user interface, the populated document;
calculating, based on the user's information, the request, and the related data object, a return on investment for the user;
receiving, via the second graphical user interface, a completed version of the populated document;
performing character recognition on the completed version of the populated document to verify that the user properly completed the populated document;
upon determining that the completed version of the populated document lacks required information, prompting a party to enter missing data; and
upon determining that the completed version of the populated document is properly completed, initiating money transfer based on progression of the workflow.

7. The system of claim 6, wherein the steps further compromise querying the data structure based on a filter associated with the request.

8. The method of claim 6, wherein the request comprises a document uploaded via the first graphical user interface.

9. The method of claim 8, wherein the method further comprises:
rendering an input interface configured to receive tags input by the user and associated with the document; and
associating the one or more generated record with the document and the received tags.

10. The method of claim 6, wherein the method further comprises populating the document with metadata associated with the one or more data records.

11. A non-transitory computer-readable storage medium storing instructions executable by one or more processors to cause the one or more processors to perform operations comprising:
receiving information via a first graphical user interface, the information comprising a request, the request comprising a user's information associated with a user;
generating a workflow in an investment management system or a fund management system, wherein the workflow is associated with a set of documents and is based on the request;
receiving a data object generated by the workflow, wherein the data object is associated with an investment;
creating one or more records within a data structure based on the data object;
querying the data structure to identify a tag associated with the data object based on the request, wherein the data structure comprises a collection of tags associated with respective data objects stored in the data structure;
providing, to the workflow, information indicative of relationships between the data objects stored in the data structure based on the collection of tags;
determining, based on the tag, a related data object comprising at least one of a progress workflow associated with an investor of the investment, a fund owned by the investor, and a compliance document;
selecting a document of the set of documents based on the request, the information indicative of relationships between the data objects, and the related data object, wherein the selected document needs to be completed by the user;
automatically populating the selected document with data comprising the one or more records;
providing, via a second graphical user interface, the populated document;
calculating, based on the user's information, the request, and the related data object, a return on investment for the user;
receiving, via the second graphical user interface, a completed version of the populated document;
performing character recognition on the completed version of the populated document to verify that the user properly completed the populated document;
upon determining that the completed version of the populated document lacks required information, prompting a party to enter missing data; and
upon determining that the completed version of the populated document is properly completed, initiating money transfer based on progression of the workflow.

12. The system of claim 11, wherein the steps further compromise querying the data structure based on a filter associated with the request.

13. The storage medium of claim 11, wherein the request comprises a document uploaded via the first graphical user interface.

14. The storage medium of claim 13, wherein the operations further comprise:
rendering an input interface configured to receive tags input by the user and associated with the document; and
associating the one or more generated record with the document and the received tags.

15. The system of claim 1 wherein the steps further comprise:
determining the workflow based on at least one of: account type information associated with the user, regulatory profile information associated with the user, or citizenship information associated with the user.

16. A workflow data management system for verifying compliance to workflows, the system comprising:
a memory; and
at least one processor configured to perform steps comprising:
receiving information via a first graphical user interface, the information comprising a request, the request comprising a user's information associated with a user;
generating a workflow associated with a set of documents and is based on the request;
receiving a data object generated by the workflow;
creating one or more records within a data structure based on the data object;

querying the data structure to identify a tag associated with the data object based on the request, wherein the data structure comprises a collection of tags associated with respective data objects stored in the data structure;
providing, to the workflow, information indicative of relationships between the data objects stored in the data structure based on the collection of tags;
determining, based on the tag, a related data object comprising at least one of a progress workflow associated with a compliance document;
selecting a document of the set of documents based on the request, the information indicative of relationships between the data objects, and the related data object, wherein the selected document needs to be executed by the user;
automatically populating the selected document with data comprising the one or more records;
providing, via a second graphical user interface, the populated document;
receiving, via the second graphical user interface, a completed version of the populated document;
performing character recognition on the completed version of the populated document to verify that the user properly completed the populated document;
based upon determining that the completed version of the populated document lacks required information, prompting a party to enter missing data; and
upon determining that the completed version of the populated document is properly completed, initiating an action according to the workflow.

\* \* \* \* \*